US008646742B2

(12) United States Patent
Hayashi et al.

(10) Patent No.: US 8,646,742 B2
(45) Date of Patent: Feb. 11, 2014

(54) SEAT RAIL DEVICE

(75) Inventors: Naoki Hayashi, Kanagawa (JP);
Hiroyuki Suzuki, Kanagawa (JP);
Hiroshi Koga, Kanagawa (JP)

(73) Assignee: Shiroki Corporation, Kanagawa (JP)

( * ) Notice: Subject to any disclaimer, the term of this patent is extended or adjusted under 35 U.S.C. 154(b) by 114 days.

(21) Appl. No.: 13/002,115

(22) PCT Filed: Jul. 2, 2009

(86) PCT No.: PCT/JP2009/062112
§ 371 (c)(1),
(2), (4) Date: Dec. 30, 2010

(87) PCT Pub. No.: WO2010/001956
PCT Pub. Date: Jan. 7, 2010

(65) Prior Publication Data
US 2011/0095161 A1 Apr. 28, 2011

(30) Foreign Application Priority Data

| Jul. 2, 2008 | (JP) | 2008-173033 |
| Aug. 7, 2008 | (JP) | 2008-204865 |
| Aug. 7, 2008 | (JP) | 2008-204888 |
| Sep. 8, 2008 | (JP) | 2008-230338 |
| Sep. 12, 2008 | (JP) | 2008-235538 |

(51) Int. Cl.
*F16M 13/00* (2006.01)
*A47C 1/00* (2006.01)

(52) U.S. Cl.
USPC ......... 248/430; 248/429; 248/419; 297/344.1

(58) Field of Classification Search
USPC ............... 248/424, 429, 419, 422; 297/344.1, 297/344.13, 344.14, 344.11
See application file for complete search history.

(56) References Cited

U.S. PATENT DOCUMENTS 5,524,504 A * 6/1996 Brandoli et al. ............... 74/527
5,676,341 A * 10/1997 Tarusawa et al. ............ 248/430

(Continued)

FOREIGN PATENT DOCUMENTS

| GB | 20 13 771 A | 8/1979 |
| GB | 2013771 A | 8/1979 |

(Continued)

OTHER PUBLICATIONS

International Search Report of PCT/JP2009/062112 (Jul. 28, 2009).

(Continued)

*Primary Examiner* — Joshua J Michener
*Assistant Examiner* — Erin W Smith
(74) *Attorney, Agent, or Firm* — Millen, White, Zelano & Branigan, P.C.

(57) ABSTRACT

A seat rail device provided with an upper rail 1 engaged with and mounted onto a lower rail 2 such that an upper bottom wall section 11 is located above a lower bottom wall section 21 and also such that an upper sloped wall section 16 is located within a lower groove 26 surrounded by a lower wall section 23, a lower top plate section 25, and a lower downwardly extending section 27; a roller 31 provided and rollably supported between the lower bottom wall section 21 and the upper bottom wall section 11; an upper ball-shaped rolling body 33 provided and rollably supported in an upper in-groove space 26a partitioned and defined in the lower groove 26 by the upper sloped wall section 16; and a lower ball-shaped rolling body 35 provided and rollably supported in a lower in-groove space 26b.

14 Claims, 19 Drawing Sheets

(56) References Cited

U.S. PATENT DOCUMENTS

| | | | |
|---|---|---|---|
| 2002/0109063 A1* | 8/2002 | Jaudouin et al. | 248/430 |
| 2003/0173880 A1 | 9/2003 | Thomas et al. | |
| 2009/0102263 A1* | 4/2009 | Kojima et al. | 297/344.1 |

FOREIGN PATENT DOCUMENTS

| | | |
|---|---|---|
| GB | 2 296 430 A | 7/1996 |
| JP | 54-115828 | 9/1979 |
| JP | 54-115828 A | 9/1979 |
| JP | 63-151325 U | 10/1988 |
| JP | 03-64536 | 6/1991 |
| JP | 3-64536 U | 6/1991 |
| JP | 06-1170 | 1/1994 |
| JP | 06-32162 | 4/1994 |
| JP | 6-32162 U | 4/1994 |
| JP | 07-164931 | 6/1995 |
| JP | 7-164931 A | 6/1995 |
| JP | 07-195964 | 8/1995 |
| JP | 7-195964 A | 8/1995 |
| JP | 8-156659 A | 6/1996 |
| JP | 08-183373 | 7/1996 |
| JP | 8-230528 A | 9/1996 |
| JP | 10-329594 A | 12/1998 |
| JP | 2003-260964 | 9/2003 |

OTHER PUBLICATIONS

NHK Spring Co Ltd., "Assembly at Seat Slide Rail and Stopper Structure of Steel Ball", Patent Abstracts of Japan of JP-07-164931, Publication Date: Jun. 27, 1995.

Imasen Denki Seisakusho; KK "Seal Rail Device", Patent Abstracts of Japan of JP-08-183373, Publication Date: Jul. 16, 1996.

Aisin Seiki Co Ltd., "Seat Slide Device", Patent Abstracts of Japan of JP-06-001170, Publication Date: Jan. 11, 1994.

Delta Kogyo Co Ltd., "Plate material Connection Structure for Vehicle", Patent Abstracts of Japan of JP-2003-260964, Publication Date: Sep. 16, 2003.

* cited by examiner

SEAT RAIL DEVICE

TECHNICAL FIELD

The present invention relates to a seat rail device where an upper rail for supporting a seat is provided on a lower rail, rolling bodies are provided between the lower and upper rails, and the upper rail is movable along the lower rail via the rolling bodies.

BACKGROUND ART

In a seat rail device that supports a seat in an automobile in a manner such that the seat can move in a forward/rearward direction, there is a demand for reduction in size, weight, and costs, while securing a required strength. For example, Patent Document 1 proposes a new rail structure. Furthermore, Patent Documents 2 to 4 propose a lock mechanism of the seat rail device.

RELATED ART DOCUMENTS

Patent Documents

Patent Document 1: Japanese Patent No. 3,495,441
Patent Document 2: Japanese Patent Application Laid-Open (JP-A) No. H07-195964
Patent Document 3: JP-A No. 2007-126080
Patent Document 4: JP-A No. 2007-223345

SUMMARY OF INVENTION

Technical Problems

However, there has been room for improvement in a seat rail device of the related art due to being insufficient in terms of reduction in size, weight, and costs without deterioration in strength.

Accordingly, an objective of the invention is to further reduce the size, weight, and costs of a seat rail device.

Furthermore, another object of the invention is to reduce the size, weight, and costs of a lock mechanism without deterioration in strength thereof.

Furthermore, another objective of the invention is to achieve a seat rail device that can reliably restrict both moving ends of an upper rail relative to a lower rail via a simple structure.

Solution to Problem

According to the invention, a seat rail device is provided, wherein an upper rail for supporting a seat is provided on a lower rail, rolling bodies are provided between the lower and upper rails, and the upper rail is movable along the lower rail via the rolling bodies. The lower rail includes, with respect to a cross-section perpendicular to the longitudinal direction of the lower rail, a lower bottom wall section that forms a rail bottom, a lower wall section that extends upward from an outer edge of the lower bottom wall section, a lower top plate section that extends from an upper edge of the lower wall section toward an inner side above the lower bottom wall section, and a lower downwardly extending section that extends downward from an edge of the lower top plate section. The upper rail includes, with respect to a cross-section perpendicular to the longitudinal direction of the upper rail, an upper upright wall section that includes a seat supporting portion formed at an upper portion thereof, an upper bottom wall section that extends toward an outer side from a lower edge of the upper upright wall section, an upper wall section that extends upward from an edge of the upper bottom wall section, and an upper sloped wall section that extends obliquely upward from an upper edge of the upper wall section. The upper rail is provided above the lower rail so that the upper bottom wall section is positioned above the lower bottom wall section and the upper sloped wall section is positioned in a lower groove having a lower opening surrounded by the lower wall section, the lower top plate section, and the lower downwardly extending section. An inter-bottom-wall rolling body is provided between the upper and lower bottom wall sections and is rollably supported so as to support the upper bottom wall section above the lower bottom wall section, an upper ball-shaped rolling body is provided and rollably supported in an upper in-groove space partitioned and defined by the upper sloped wall section in the lower groove, and a lower ball-shaped rolling body is provided and rollably supported in a lower in-groove space so that the upper sloped wall section is supported from both sides in the lower groove.

In an aspect of the present invention, the upper sloped wall section, which extends obliquely upward from the upper edge of the upper wall section, can extend in a direction facing the lower downwardly extending section from the lower wall section. The upper in-groove space can be defined as a space surrounded by the lower wall section, the lower top plate section, and the upper sloped wall section. The lower in-groove space can be defined as a space surrounded by the lower downwardly extending section and the upper sloped wall section.

Furthermore, a recessed groove that is recessed toward an upper surface of the upper sloped wall section can be formed on a lower surface of the upper sloped wall section and/or a recessed groove that is recessed toward an outer surface of the lower downwardly extending section can be formed on an inner surface of the lower downwardly extending section, so that the lower ball-shaped rolling body is received in the formed recessed groove and is rollably supported without falling out.

In another aspect of the invention, the upper sloped wall section, which extends obliquely upward from the upper edge of the upper wall section, can extend in a direction facing the lower wall section from the lower downwardly extending section. The upper in-groove space can be defined as a space surrounded by the lower downwardly extending section, the lower top plate section, and the upper sloped wall section, and the lower in-groove space can be defined as a space surrounded by the lower wall section and the upper sloped wall section.

A recessed groove that is recessed toward an upper surface of the upper sloped wall section can be formed on a lower surface of the upper sloped wall section and/or a recessed groove that is recessed toward an outer surface of the lower wall section can be formed on an inner surface of the lower wall section, so that the lower ball-shaped rolling body can be received in the formed recessed grooves and can be rollably supported without falling out.

Alternatively, a gap between wall surfaces, which face each other with the lower ball-shaped rolling bodies interposed therebetween, may be formed to narrow toward the lower side. For example, the lower wall section may be formed to be inclined so that a gap between the wall surfaces facing each other narrows toward the lower side, or the downwardly extending section may be formed to be inclined likewise.

It is practical for the inter-bottom-wall rolling body to be a roller-shaped rolling body.

It is practical for the inter-bottom-wall rolling body to be a ball-shaped rolling body.

In the seat rail device according to the invention, an upper ridge section, which protrudes downward, can be formed at a middle portion of the upper bottom wall section in a width direction of the upper bottom wall section. A lower protruding wall section, which protrudes upward from an inner edge of the lower bottom wall section, can be formed at the lower bottom wall section. At least one of the ball-shaped rolling bodies can be rollably supported by an outer portion of the lower bottom wall section, the lower wall section, and an outer wall surface of the upper ridge section. The remainder of the ball-shaped rolling bodies can be rollably supported by an inner portion of the lower bottom wall section, the lower protruding wall section, and an inner wall surface of the upper ridge section.

The seat rail device according to the invention can include a second upper bottom wall section that extends toward the inner side from the lower edge of the upper upright wall section, and a second upper extension section that extends upward from an edge of the second upper bottom wall section.

Preferably, the lower rail further includes a lower locking section that is folded so as to surround the second upper extension section and extends from the inner edge of the lower bottom wall section while maintaining a predetermined gap between the lower locking section and the second upper bottom wall section and the second upper extension section.

The second upper extension section preferably extends obliquely upward from the edge of the second upper bottom wall section so as to form an obtuse angle.

The height of the lower locking section, which is folded so as to surround the second upper extension section, may be lower than that of a lower edge of the lower downwardly extending section.

In an aspect of the invention, the upper upright wall section, the upper bottom wall section, the upper wall section, and the upper sloped wall section of the upper rail can be formed on a first plate. The second upper bottom wall section and the second upper extension section can be formed on a second plate. The second plate preferably includes a second upper upright wall section which extends along the upper upright wall section of the first plate.

In an embodiment where the second plate is provided as described above, if the second plate is thinner than the first plate, reduction in weight without deterioration in strength can be achieved.

Likewise, in the embodiment where the second plate is provided, the position of the rolling body that is provided between the lower bottom wall section of the lower rail and the upper bottom wall section of the upper rail can be restricted by a lower end portion of the second plate.

It is practical for the seat rail device according to the invention to further include a lock mechanism that restricts the movement of the upper and lower rails. Specifically, the lock mechanism includes a lock member that includes engagement protruding portions and is supported on the inner surface of the upper upright wall section of the upper rail, proximal through-holes that are formed in the upper upright wall section of the upper rail, and lock-engagement sections that are formed at the lower downwardly extending section of the lower rail. The upper rail is locked in a movement prohibition state when the engagement protruding portions of the lock member are engaged with the lock-engagement sections while being inserted into the proximal through-holes.

In the seat rail device including the lock mechanism, the lower rail preferably includes an inner wall section on the inside of the lower bottom wall section. The height of the inner wall section is preferably set to a height so that the lock member is mounted on the upper rail above the inner wall section. The height of the inner wall section is preferably set to be lower than that of the lower end of the lower downwardly extending section.

Furthermore, the lower rail further includes a lower locking section that includes a second top wall section extending toward the outer side from an end edge of the inner wall section so as to have a height lower than the lower end of the lower downwardly extending section and a second downwardly extending section extending toward the lower bottom wall section from an end edge of the second top wall section. The upper rail includes the upper upright wall section provided on the outer side and the second upper upright wall section provided on the inner side, wherein the upper upright wall section and the second upper upright wall section are parallel to each other. The second upper bottom wall section extends from the second upper upright wall section that is formed on the inner side. The upper rail further includes a second upper bottom wall section and a second upper extension section which extends upward from an end edge of the second upper bottom wall section, wherein an end edge of the second upper extension section is positioned in the lower locking section. The lock member is supported on the inner surface of the second upper upright wall section.

Specifically, the lock mechanism further includes distal through-holes formed in the upper wall section. The upper rail is locked in a movement prohibition state when the engagement protruding portions of the lock member are engaged with the lock-engagement sections and are inserted into the distal through-holes while being inserted into the proximal through-holes.

For example, the lock member is a spring formed by bending a linear elastic body in a corrugated shape so that the engagement protruding portions are formed. Both ends of the lock member are supported on a surface of the upper upright wall section. The lock-engagement sections are formed by cutting the lower end edge of the lower downwardly extending section in a corrugated shape. When a middle portion of the spring is pressed and moved down, the engagement protruding portions are disengaged from the lock-engagement sections and a locked state thereof is released. When the middle portion of the spring is not pressed down, the spring returns due to a spring force and the engagement protruding portions are engaged with the lock-engagement sections and can enter into a locked state.

The proximal through-holes formed at the upper upright wall section and the distal through-holes formed at the upper wall section include lock pieces that extend downward from the inner surfaces of upper wall portions of the proximal through-holes and the distal through-holes in to the through-holes. Accordingly, lock strength can be increased.

The width of the upper bottom wall section of the upper rail is preferably larger than that of the second upper bottom wall section.

In another embodiment of the invention, the upper rail includes the upper upright wall section provided on the outer side and the upper upright wall section provided on the inner side. The upper upright wall sections are parallel to each other. A lock mechanism, which restricts the movement of the upper and lower rails, includes proximal through-holes that are formed at the upper upright wall section formed on the outer side; a force applying portion through-hole that is formed in the upper upright wall section formed on the inner side; lock-engagement sections that are formed by cutting the lower end edge of the lower downwardly extending section in a corrugated shape; and a lock member that is formed by bending a linear elastic body so as to include a base, engagement protruding portions protruding from the base, and a force applying portion protruding from the base in a direction opposite to the engagement protruding portions. In the lock member, the base is interposed between the upper upright wall section formed on the outer side and the second upper upright wall section formed on the inner side, the force applying portion is led to the outside of the rail through the force applying portion through-hole, and the engagement protruding portions are engaged with/disengaged from the lock-engagement sections through the proximal through-holes. The engagement protruding portions are engaged with the lock-engagement sections by an elastic force of the lock member so that the upper rail is locked in a movement prohibition state. The engagement protruding portions are disengaged from the lock-engagement sections by the operation of the force applying portion against the elastic force, so that the locked state of the upper rail is released.

Holding portions, which support the lock member formed of the linear elastic body, are cut and raised and can be formed at one of the outer-side upper upright wall section and the inner-side second upper upright wall section. Both end portions of the base of the lock member can be lock-engaged with the holding portions.

The lower rail further can include an inner wall section that extends upward from the other edge of the lower bottom wall section. In this embodiment, the height of the inner wall section is desirably set to be lower than that of the force applying portion through-hole.

The lock mechanism, which is received between the upper upright wall sections formed on the inner and outer sides, further includes distal through-holes that are formed at the upper wall section so as to passes through the upper wall section. The engagement protruding portions of the lock member can be engaged with/disengaged from the lock-engagement sections through the proximal through-holes, and the ends of the engagement protruding portions can be lock-engaged with the distal through-holes.

The proximal through-holes formed in the outer-side upper upright wall section and the distal through-holes formed in the upper wall section preferably include lock pieces that extend downward from the inner surfaces of upper wall portions of the respective through-holes into the through-holes.

In an embodiment where a lock mechanism is received between the upper upright wall sections formed on the inner and outer sides, preferably the lower rail further includes a second top wall section that extends inward in the width direction of the rail from an end of the inner wall section so as to have a height lower than the force applying portion through-hole, and a second downwardly extending section extending downward from an end edge of the second top wall section. Preferably, the upper rail further includes a second upper bottom wall section that extends from a lower end of the upper upright wall section of the inner side toward the inner wall section of the lower rail so as to have a width smaller than the width of the upper bottom wall section; and a second upper extension section which extends upward from an end of the second upper bottom wall section and of which an end is positioned in a lower locking section formed by the second downwardly extending section, the second top wall section, and the inner wall section of the lower rail.

The seat rail device according to the invention can further include a stopper mechanism that restricts a moving range of the upper rail by lock-engaging the locking section, which is formed on the upper rail, with stoppers that are disposed near both ends of the lower rail in a longitudinal direction thereof. In an embodiment, the stopper mechanism can include an installation base provided at a position lower than the lower end of the lower downwardly extending section, and stoppers that are formed at the lower wall section so that ends of the stoppers protrude toward the inner side from the inner wall of the lower wall section. The locking section is formed so as to protrude toward the outer side from an outer end of the upper bottom wall section or the upper wall section, and an end of the locking section is a protrusion positioned in a range where the stopper and the protrusion are lock-engaged with each other.

Preferably the lower rail further includes a lower locking section that extends upward from an inner edge of the lower bottom wall section.

The lower rail may further include a second top wall section that extends inward in the width direction of the rail from an end of the inner wall section so as to have a height lower than the force applying portion through-hole, and a second downwardly extending section extending downward from an end edge of the second top wall section. The upper rail may further include a second upper bottom wall section that extends toward the inner wall section of the lower rail from the lower end of the upper upright wall section formed on the inner side so as to be narrower than the upper bottom wall section, and a second upper extension section which extends upward from the end of the second upper bottom wall section, wherein an end of the second upper bottom wall section is positioned in a lower locking section formed by the second downwardly extending section, the second top wall section, and the inner wall section of the lower rail.

The second top wall section and the inner wall section of the lower rail maybe set so that a predetermined difference in height is secured between the lower end of the downwardly extending section and the highest portions of the second top wall section and the inner wall section. The width of the upper bottom wall section of the upper rail may be larger than that of the second bottom wall section.

The stoppers can be formed of protruding pieces that are formed by cutting and raising the lower wall section.

Alternatively, the stoppers can be formed of rivets that are mounted on the lower wall section.

The rivets can be used for fixing the lower rail to a leg bracket, which fixes the lower rail to a floor.

The leg bracket can include an upright plate section that comes into close contact with an outer surface of the lower wall section of the lower rail, an upper plate section that comes into close contact with an upper surface of the top wall section of the lower rail, and a lower plate section that comes into close contact with a lower surface of the bottom wall section of the lower rail.

In another aspect of the invention, the seat rail device according to the invention further includes a stopper mechanism for restricting a moving range of the upper rail by lock-engaging the locking section, which is formed at the upper rail, with stoppers that are disposed near both ends of the lower rail in a longitudinal direction thereof. The stopper mechanism includes the stoppers that are formed on a leg bracket for fixing the lower rail to a floor surface. The locking section is formed so as to protrude toward the outer side from an outer end of the lower bottom wall section or the lower wall section, and an end of the locking section is a protrusion positioned in a range where the stopper and the protrusion are lock-engaged with each other.

In the seat rail device according to another aspect, a detach-prevention bent portion, which is engaged with the upper sloped wall section of the upper rail and receives a peeling load, is formed on the leg bracket which fixes the lower rail to the floor.

Effects of the Invention

The lower bottom wall section and the upper bottom wall section exist (are provided) between the upper upright wall section of the upper rail and the lower wall section of the lower rail and the inter-bottom-wall rolling bodies are provided between these two bottom wall sections, so that the seat rail device according to the invention receives and supports a vertical force. Accordingly, the seat rail device can be formed relatively narrow. Therefore, reduction in size, weight, and costs can be achieved. Furthermore, since the upper and lower ball-shaped rolling bodies provided on both sides of the upper sloped wall section are interposed and supported between the lower wall section and the lower downwardly extending section that are positioned on both sides of the upper and lower ball-shaped rolling bodies, sufficient strength against a horizontal force (component force) can be secured. Furthermore, if an impact force, which pulls the upper upright wall section obliquely upward toward the inner side, is applied to the upper upright wall section through the belt anchor, the impact force is received through the upper ball-shaped rolling bodies that are supported by the lower top plate section and the upper sloped wall section. Therefore, sufficient strength can be secured.

DESCRIPTION OF EMBODIMENTS

Figure 1:
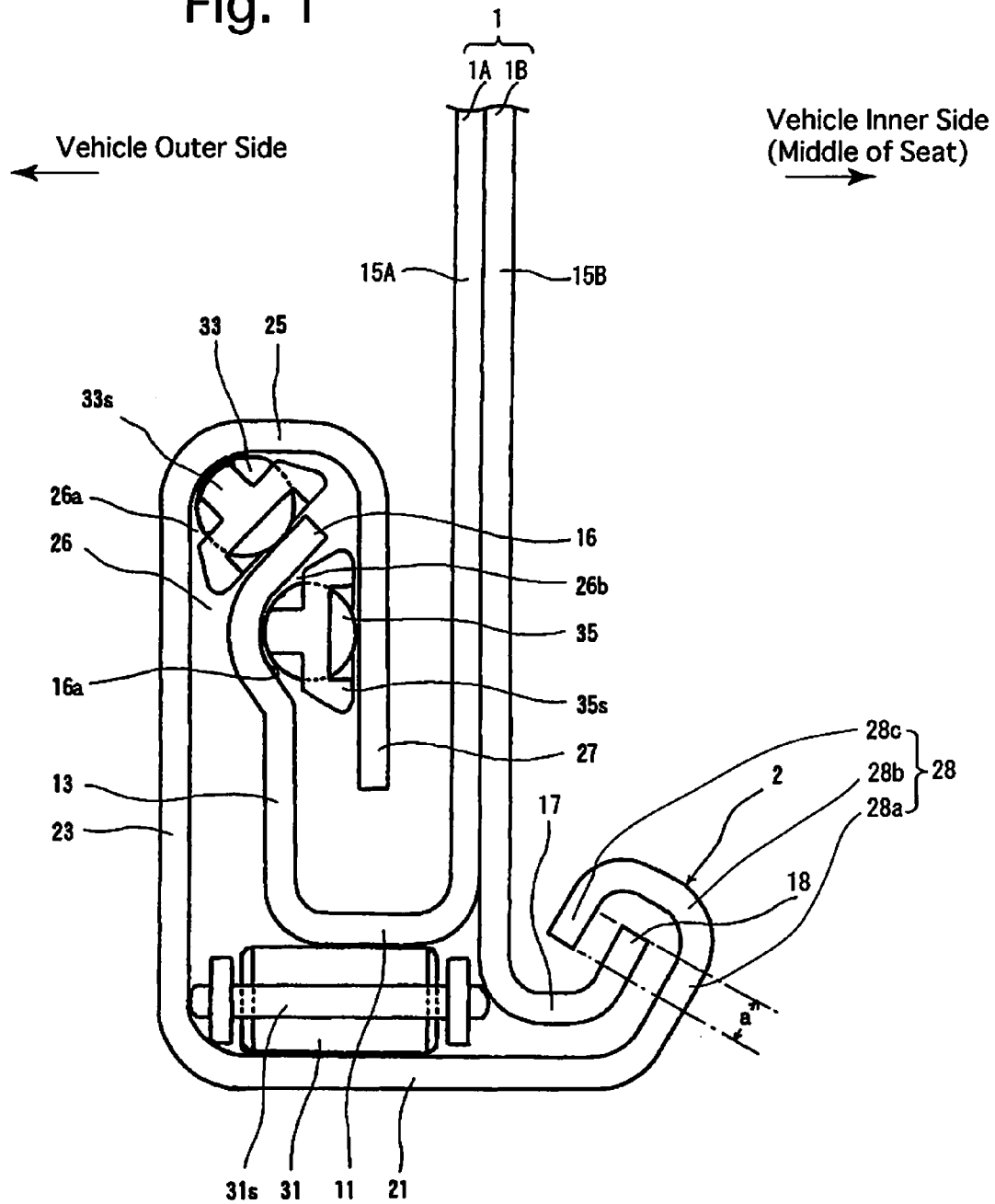
FIG. 1 is a cross-sectional view showing fundamental components of a first embodiment of a seat rail device according to the invention.

Embodiments of the invention will be described below with reference to the drawings. FIG. 1 is a cross-sectional view showing fundamental components of a first embodiment of the invention (a cross-sectional view taken along a plane perpendicular to the longitudinal direction of upper and lower rails 1 and 2).

A seat rail device of the first embodiment includes an upper rail 1 that is provided above a lower rail 2. Rolling bodies 31, 33, and 35 are provided at three positions within the gap between the upper and lower rails 1 and 2, and the upper rail 1 is movable along the lower rail 2 by the respective rolling bodies 31, 33, and 35. Two sets of upper and lower rails 1 and 2 are disposed on the left and right sides. The right side of FIG. 1 corresponds to the inside of an automobile (inner side/the middle of a seat), and the left side corresponds to the outside of an automobile (outer side) (i.e., two sets of the upper and lower rails 1 and 2 are symmetrically disposed on the left and right sides of the right position in FIG. 1.). A seat that is supported by the seat rail devices mounted on the left and right sides is intended as a seat for, e.g., an automobile. Accordingly, the seat for an automobile is supported on a pair of (left and right) upper rails 1. Furthermore, a belt anchor (not shown) is fastened to a rear end portion of the upper rail 1, which is mounted on the inner side (the inside of the automobile), of the pair of (left and right) upper rails.

The upper rail 1 extends in a direction perpendicular to the page of FIG. 1 and has a uniform cross-section. The upper rail 1 includes a first plate (plate section) 1A and a second plate (plate section) 1B. The first plate 1A includes an upper upright wall section 15A, an upper bottom wall section 11, an upper wall section 13, and an upper sloped wall section 16. The upper upright wall section 15A is provided so as to be perpendicular to the floor surface of the automobile when mounted onto the lower rail 2. The upper bottom wall section 11 extends toward the outer side from the lower edge of the upper upright wall section 15A. The upper wall section 13 extends upward from the edge of the upper bottom wall section 11. The upper sloped wall section 16 extends obliquely upward from the upper edge of the upper wall section 13.

The second plate 1B includes a second upper upright wall section 15B that is fixed to the surface of the upper upright wall section 15A of the first plate 1A facing the inside of the automobile. The height of the lower edge of the second upper upright wall section 15B is set lower than the height of the lower edge of the upper upright wall section 15A, i.e., the height of the upper bottom wall section 11. Furthermore, a second upper bottom wall section 17 extends toward the inner side from the lower edge of the second upper upright wall section 15B, and a second upper extension section 18 extends obliquely upward from the edge of the second upper bottom wall section so as to form an obtuse angle.

The first and second plates 1A and 1B are formed as separate plates in the embodiment shown in the drawing. However, the first and second plates can be formed as one plate by roll forming. In other words, similar to a so-called hat-shaped upper rail, the upper end portions of the upper upright wall section 15A and the second upper upright wall section 15B can be connected to each other by a top plate section. Furthermore, the first and second plates can be formed as a single member by the extrusion molding of an aluminum alloy. In this embodiment, the upper upright wall section 15A and the second upper upright wall section 15B form an integrated upper upright wall section. Furthermore, in a more preferred embodiment, the basic structure of the seat rail device according to the invention is formed by only the first plate 1A and the second plate 1B is added.

The lower rail 2 extends in a direction perpendicular to the page of FIG. 1. With respect to a cross-section perpendicular to the longitudinal direction of the lower rail, the lower rail 2 includes a lower bottom wall section 21 that is provided parallel to the floor surface of the automobile as a rail bottom; a lower wall section 23 that extends upward from the outer edge of the lower bottom wall section 21 (which corresponds to the outside when seen from a seated person/ the left side in FIG. 1, similarly hereinafter); a lower top plate section 25 that extends from the upper edge of the lower wall section 23 toward the inner side that is a position above the lower bottom wall section 21 (the inside when seen from a seated person/the right side in FIG. 1, similarly hereinafter); and a lower downwardly extending section 27 that extends downward from the edge of the lower top plate section 25.

The lower bottom wall section 21 extends toward the inner side so as to correspond to the second upper bottom wall section 17 and the second upper extension section 18 of the upper rail 1; and the end portion of the lower bottom wall section extends so as to be bent obliquely upward toward the right side of the drawing at an obtuse angle and is folded so as to surround the second upper extension section 18. Accordingly, a lower locking section 28 is formed at the lower rail 2. The lower locking section 28 includes an inner wall section 28a, a second top wall section 28b, and a second downwardly hanging section 28c. The inner wall section 28a is bent from the inner edge of the bottom wall section 21 at an obtuse angle and extends obliquely upward toward the inner side so that the maximum height of the inner wall section is smaller than that of the lower end of the lower downwardly hanging section 13. The second top wall section 28b is bent from the end edge of the inner wall section 28a at an angle of approximately 90 degrees and extends obliquely upward toward the outer side so that the maximum height of the second top wall section 28b is smaller than that of the lower end of the downwardly hanging section 27. The second downwardly hanging section 28c is bent from the end edge of the second top wall section 28b at an angle of approximately 90 degrees and extends toward the bottom wall section 21 (obliquely downward toward the outer side).

The upper and lower rails 1 and 2 are mounted so that the upper bottom wall section 11 is positioned parallel to and above the lower bottom wall section 21, and the upper sloped wall section 16 is positioned in a lower groove 26 having a lower opening surrounded by the lower wall section 23, the lower top plate section 25, and the lower downwardly hanging section 27. Accordingly, since the upper sloped wall section 16 obliquely enters the lower groove 26 as described above, the lower groove 26 is divided into upper and lower in-groove spaces 26a and 26b that are partitioned and defined by the upper sloped wall section 16.

Rollers 31 that constitute inter-bottom-wall rolling bodies are provided between the upper and lower bottom wall sections 11 and 21. One roller provided near each of the front and rear ends of the rail in the longitudinal direction, i.e., a total of two rollers are used as the rollers 31, and a distance between both the rollers is maintained constant by a spacer 31s that extends in the longitudinal direction of the rail. The roller 31 functions to receive a vertical force that is applied to the seat rail device. Accordingly, the upper rail 1 is supported on the lower rail 2 so as to be capable of moving forward and backward.

Upper ball-shaped rolling bodies 33 are provided in the upper in-groove space 26a that is defined by the upper sloped wall section 16 positioned in the lower groove 26 surrounded by the lower wall section 23, the lower top plate section 25, and the lower downwardly hanging section 27. The upper ball-shaped rolling bodies 33 are supported by receiving the pressing forces that are applied from the lower wall section 23, the lower top plate section 25, and the upper sloped wall section 16. Furthermore, the upper ball-shaped rolling bodies 33 roll while pushing them back by the reaction thereof. Accordingly, the upper ball-shaped rolling bodies 33 allow the upper rail 1 to move relative to the lower rail 2. Two ball-shaped rolling bodies 33 provided near each of the front and rear ends of the rail in the longitudinal direction, i.e., a total of four ball-shaped rolling bodies 33 are used, and distances between the respective balls are maintained constant by spacers 33s that extend in the longitudinal direction of the rail. The size of the upper ball-shaped rolling body 33 is determined by the shape and size of the upper in-groove space 26a.

If an impact force, which pulls the upper rail obliquely upward toward the right side, is applied to the upper rail 1 from the belt anchor (not shown), the lower groove 26 is lock-engaged with the upper sloped wall section 16, so that the upper rail 1 is prevented from coming off the lower rail 2.

Lower ball-shaped rolling bodies 35 are provided in the lower in-groove space 26b that is defined by the upper sloped wall section 16 positioned in the lower groove 26 surrounded by the lower wall section 23, the lower top plate section 25, and the lower downwardly hanging section 27. The lower ball-shaped rolling bodies 35 are supported by the pressing forces that are applied from the lower downwardly hanging section 27 and the upper sloped wall section 16, and the lower ball-shaped rolling bodies 35 roll while pushing back against the applied pressing forces by the reaction thereof. Accordingly, the lower ball-shaped rolling bodies 35 allow the upper rail 1 to move relative to the lower rail 2. Two ball-shaped rolling bodies provided near each of the front and rear ends of the rail in the longitudinal direction, i.e., a total of four ball-shaped rolling bodies are used as the lower ball-shaped rolling bodies 35, and distances between the respective balls are maintained constant by spacers 35s that extend in the longitudinal direction of the rail. The size of the lower ball-shaped rolling body 35 is determined by the shape and size of the lower in-groove space 26b, and may be equal to or different from that of the above-mentioned upper ball-shaped rolling body 33.

Note that in the device shown in the drawings, a recessed groove 16a is formed at the upper sloped wall section 16 and the lower ball-shaped rolling bodies 35 are received in the recessed groove 16a, so that the lower ball-shaped rolling bodies 35 do not fall out; however, instead of or in addition to this recessed groove 16a, a recessed groove may be formed at the lower downwardly hanging section 27 or the gap between the lower downwardly hanging section 27 and the upper wall section 13 maybe formed to increasingly narrow toward the lower side, so that the same function as described above can be obtained.

As described above, the lower bottom wall section 21 and the upper bottom wall section 11 exist (are provided) between the upper upright wall section 15A of the upper rail 1 and the lower wall section 23 of the lower rail 2 and the rollers 31 are provided between these two bottom wall sections 21 and 11, so that the seat rail device of this embodiment receives and supports a vertical force. Accordingly, the seat rail device can be formed to be relatively narrow in width. Therefore, reduction in size, weight, and costs can be achieved.

Furthermore, since the upper and lower ball-shaped rolling bodies 33 and 35 provided on both sides of the upper sloped wall section 16 are interposed and supported between the lower wall section 23 and the lower downwardly hanging section 27 that are positioned on both sides of the upper and lower ball-shaped rolling bodies 33 and 35, sufficient strength against a horizontal force (component force) can be secured.

Furthermore, if an impact force, which pulls the upper upright wall section obliquely upward toward the inner side, is applied to the upper upright wall section 15A via the belt anchor (not shown), the impact force causes the upper sloped wall section 16 to be received by and lock-engaged with the lower top plate section 25 via the upper ball-shaped rolling bodies 33 that are supported by the lower top plate section 25 and the upper sloped wall section 16; thereby, a sufficient strength can be secured.

Moreover, in this embodiment, the lower locking section 28 is formed at the lower rail 2 so as to surround the second upper extension section 18. Accordingly, even in the case a very large impact force, which pulls the upper upright wall section obliquely upward toward the inner side, is applied to the upper upright wall section 15A through the belt anchor (not shown), the second upper extension section 18 can be reliably lock-engaged with the lower locking section 28. Therefore, sufficient strength can be secured.

In addition, since the second upper extension section 18 does not extend upward in the vertical direction but extends obliquely upward from the edge of the second upper bottom wall section 17, it is sufficient for the lower rail 2 to have a small peripheral width (the entire length in the width direction) for securing a necessary length that is required for reliable lock-engagement against a large impact force applied from the belt anchor, this necessary length being defined as an engagement margin "a" of the lower locking section 28 that is folded so as to surround the second upper extension section 18 (the overlapping length "a" of the folded end portion of the lower locking section 28 and the second upper extension section 18). Therefore, reduction in weight can be achieved.

Furthermore, since the height of the lower locking section 28 is set lower than that of the lower downwardly hanging section 27, a sufficient space can be secured, for example, to dispose a drive source, a drive mechanism, or the like, for the seat rail device above the lower locking section 28.

Furthermore, the width of the upper bottom wall section 11 of the upper rail 1 in the horizontal direction in the drawing is larger than that of the second upper bottom wall section 17. In other words, a right portion of the seat rail device on the right side of a boundary between the upper upright wall section 15A and the second upper upright wall section 15B in FIG. 1 is smaller than a left portion thereof, and the right portion is lighter than the left portion.

Figure 2:
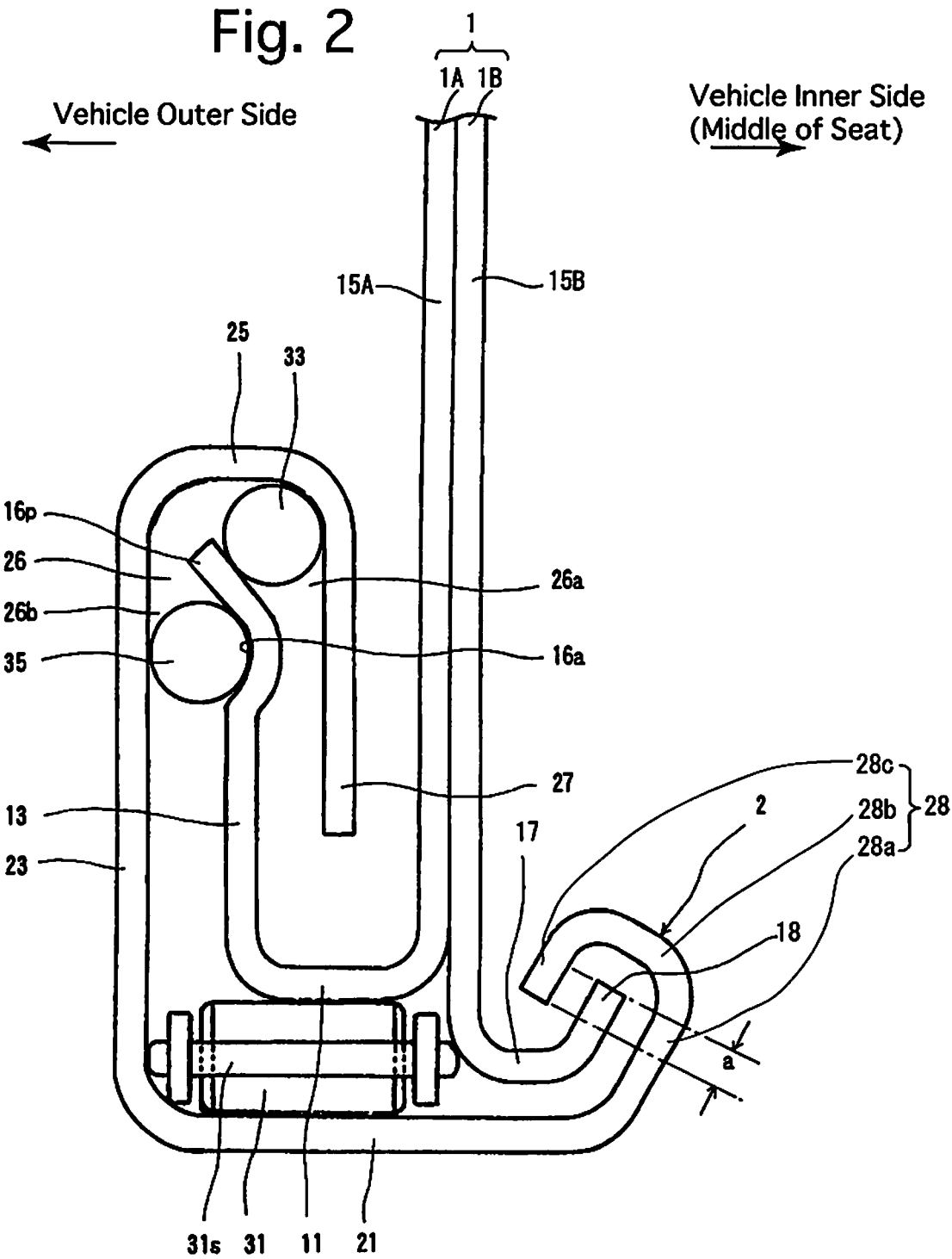
FIG. 2 is a cross-sectional view showing fundamental components of a second embodiment of the seat rail device.

FIG. 2 is a cross-sectional view showing fundamental components of a second embodiment of the seat rail device according to the invention (a cross-sectional view taken along a plane perpendicular to the longitudinal direction of the upper and lower rails 1 and 2). In the seat rail device shown in FIG. 2, an upper sloped wall section 16p, which extends obliquely upward from the upper edge of an upper wall section 13, extends in a direction opposite to the direction in the first embodiment, i.e., a direction facing the lower wall section 23 away from the lower downwardly hanging section 27. Since other structures are the same as those of the first embodiment, the same components are denoted by the same reference numerals. Note that spacers for restricting distances between the ball-shaped rolling bodies 33 and 35 are not shown in FIG. 2.

Figure 3:
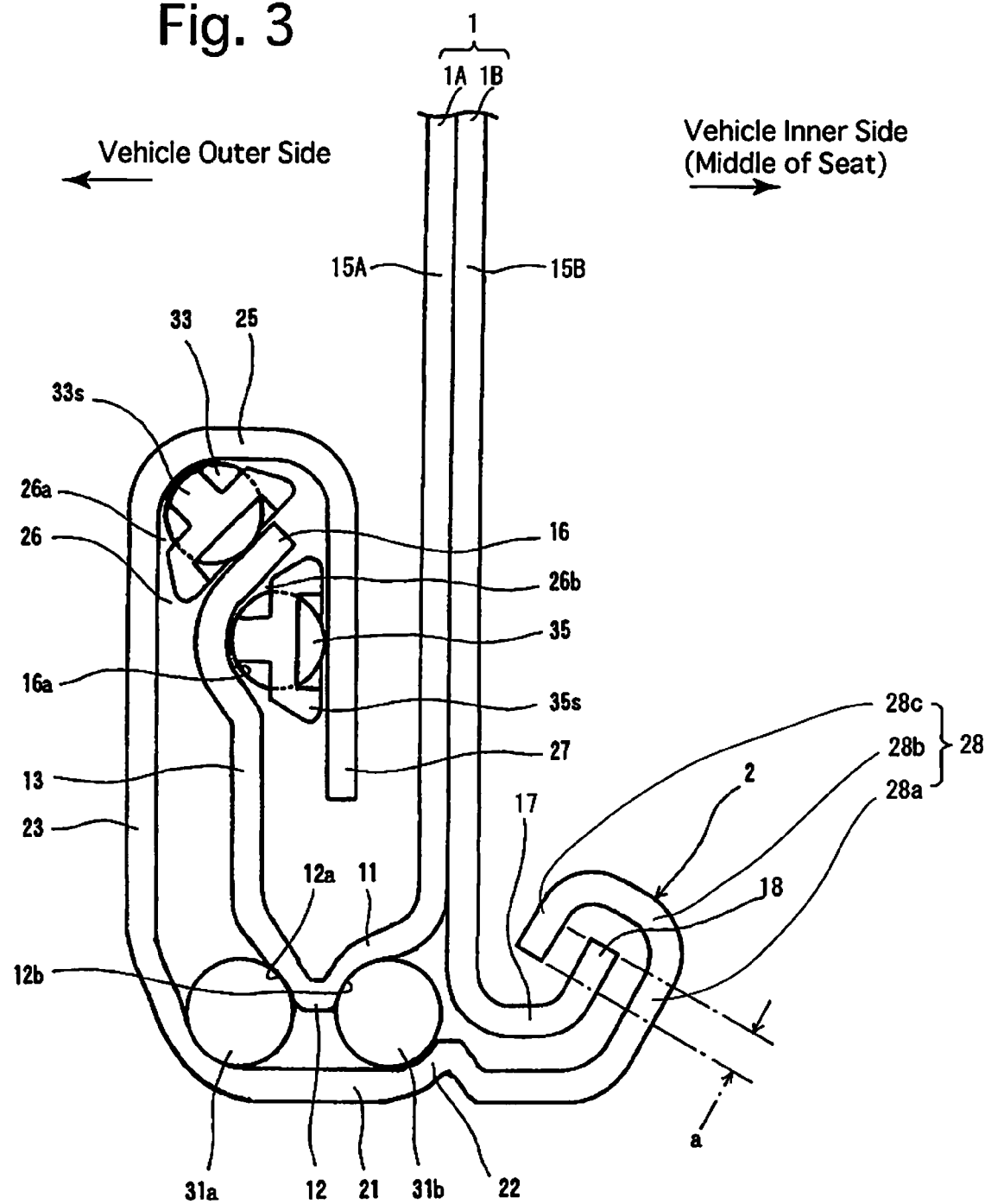
FIG. 3 is a cross-sectional view showing fundamental components of a third embodiment of the seat rail device.

FIG. 3 is a cross-sectional view showing fundamental components of a third embodiment of the seat rail device (a cross-sectional view taken along a plane perpendicular to the longitudinal direction of the upper and lower rails 1 and 2). In the seat rail device shown in FIG. 3, ball-shaped rolling bodies 31a and 31b are used as the inter-bottom-wall rolling bodies. Furthermore, an upper ridge section 12 is formed in the upper bottom wall section 11 and a lower protruding wall section 22 is formed at the inner side of the lower bottom wall section 21 so as to correspond to the ball-shaped rolling bodies. Accordingly, the upper ridge section and the lower protruding wall section restrict the ball-shaped rolling bodies 31a and 31b. Namely, the ball-shaped rolling body 31a is restricted by an outer wall surface 12a of the upper ridge section 12 and a lower bottom wall section 21, and the ball-shaped rolling body 31b is restricted by an inner wall surface 12b of the upper ridge section 12 and a lower protruding wall section 22. Since other structures are the same as those of the first embodiment, the same components are denoted by the same reference numerals. Note that spacers for restricting the positions of the ball-shaped rolling bodies 31a and 31b are not shown in FIG. 3.

Figure 4:
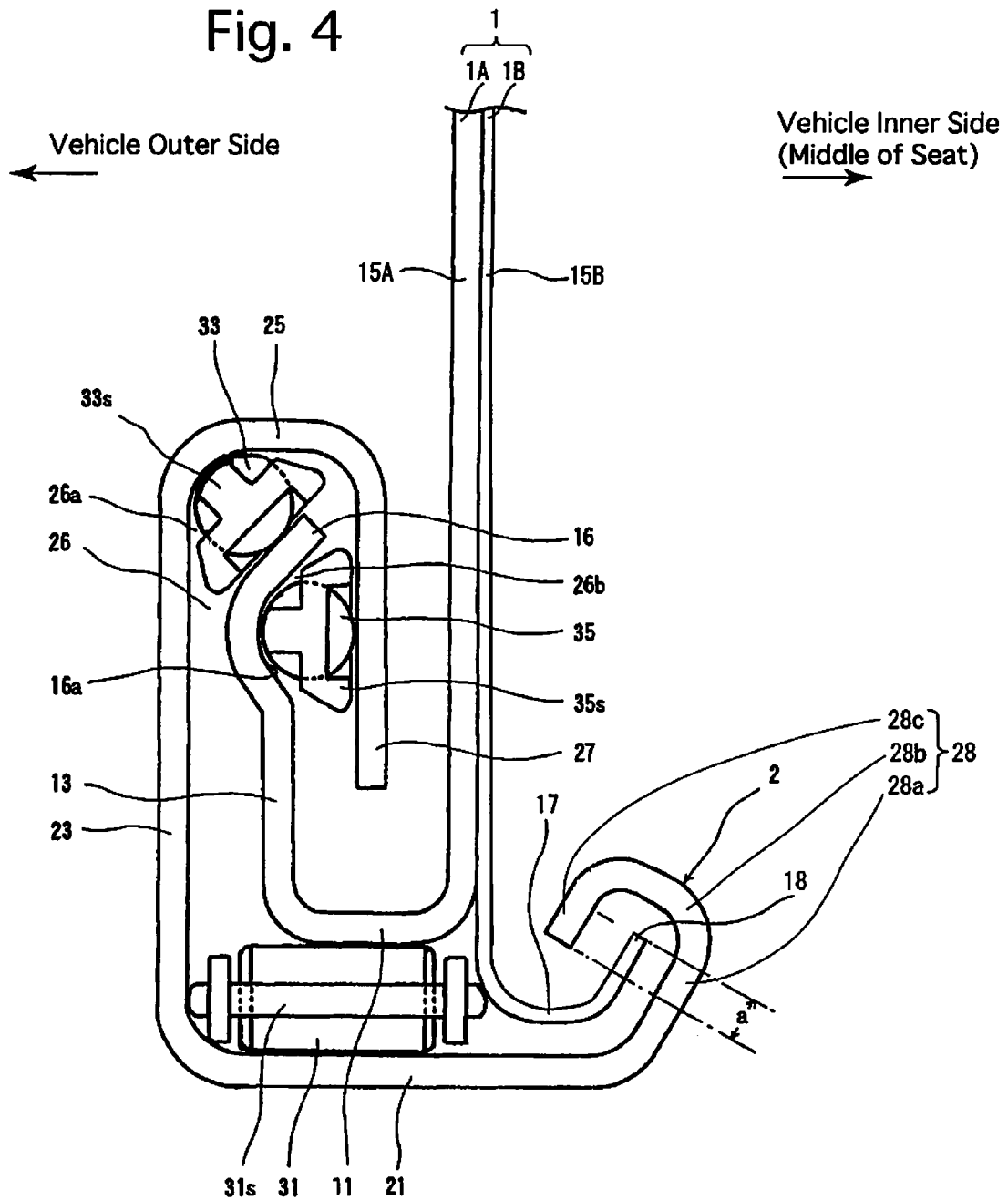
FIG. 4 is a cross-sectional view showing fundamental components of a fourth embodiment of the seat rail device.
Figure 5:
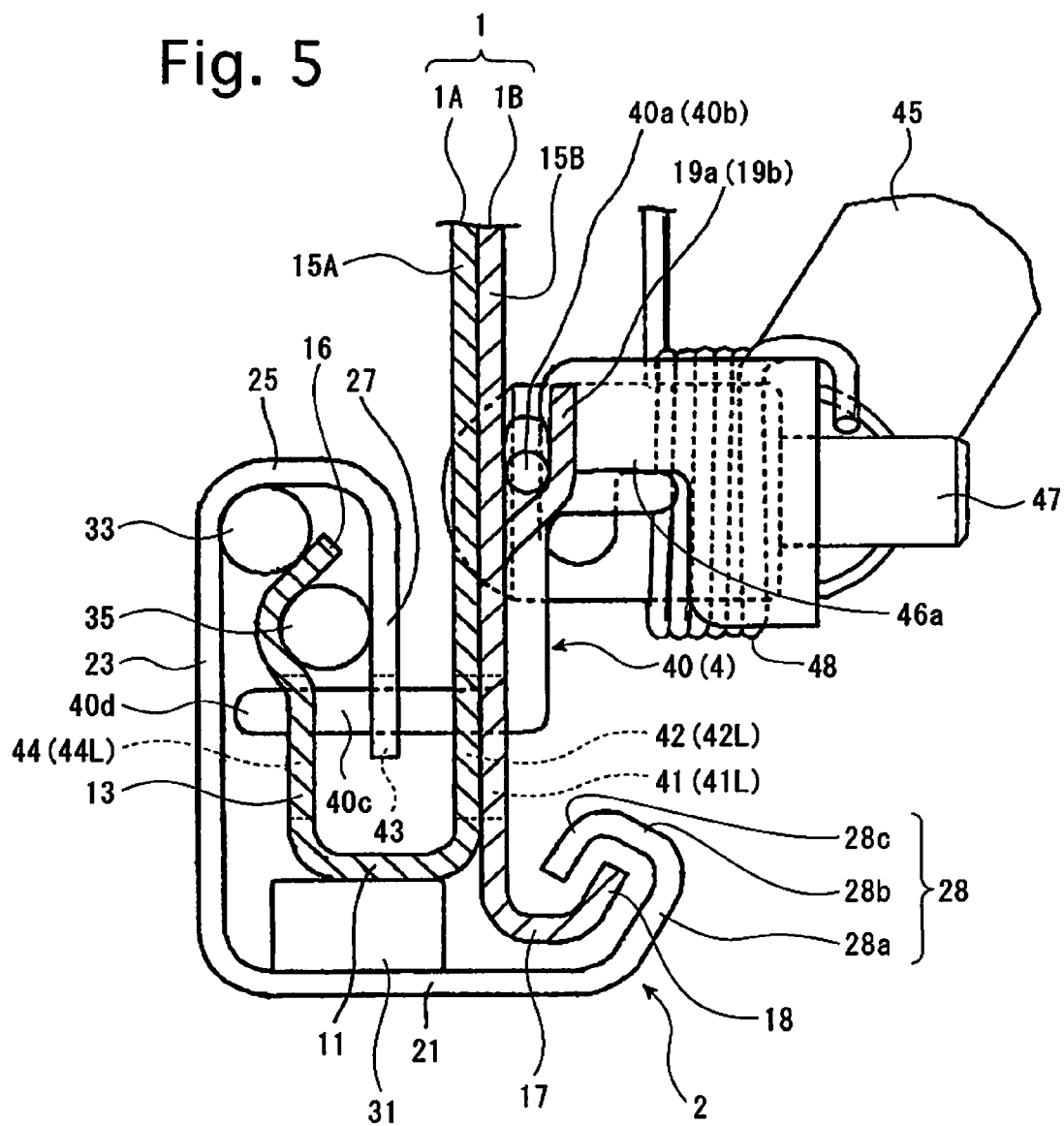
FIG. 5 is a cross-sectional view showing fundamental components taken along a line V-V of FIG. 9 and illustrating an embodiment of a seat rail device that includes a lock mechanism of the invention.

FIG. 4 is a cross-sectional view showing fundamental components of a fourth embodiment of the seat rail device (a cross-sectional view taken along a plane perpendicular to the longitudinal direction of the upper and lower rails 1 and 2). In this embodiment, a second plate 1B is thinner than a first plate 1A. Namely, if the first and second plates 1A and 1B are formed as separate members with the same material (specific gravity), the first plate 1A is thick since the first plate requires strength in order to achieve the function of supporting the upper rail. However, since the second plate 1B has an auxiliary function of restrict a rolling body guide 31s (roller-shaped rolling body 31), the second plate may be thinner than that of the first plate 1A. Reduction in weight can be achieved by making the second plate 1B thinner than the first plate 1A as described above. The embodiment shown in FIG. 4 is a modification of the embodiment shown in FIG. 1. However, even in the embodiments shown in FIGS. 2 and 3, the second plate 1B can likewise be made thinner than the first plate 1A if the first and second plates 1A and 1B are formed as separate members.

FIGS. 5 to 8 show another embodiment of the seat rail device according to the invention. In this embodiment, a lock mechanism 4 is added to a seat rail device, which includes upper and lower rails 1 and 2 having the structure described in FIG. 1. In regard to the upper and lower rails 1 and 2, the same components are denoted by the same reference numerals and the description thereof will not be repeated.

The lock mechanism 4 includes a lock member 40, a proximal through-hole 41, a proximal through-hole 42, lock-engagement sections 43, and distal through-holes 44. The proximal through-hole 41 is formed at a second upper upright wall section 15B of an upper rail 1. The proximal through-hole 42 is formed at an upper upright wall section 15A. The lock-engagement sections 43 are formed as a plurality of notches that are formed at regular intervals in the longitudinal direction of a rail at the lower end of a lower downwardly hanging section 27 of a lower rail 2. The distal through-holes 44 are formed at an upper wall section 13 of the upper rail 1. The proximal through-holes 41 and 42 and the distal through-hole 44 are formed in a U shape (a reverse U shape) that has an under side and left and right sides. Lock pieces 41L, 42L, and 44L, which hang downward from above, are formed in the through-holes.

Figure 6:
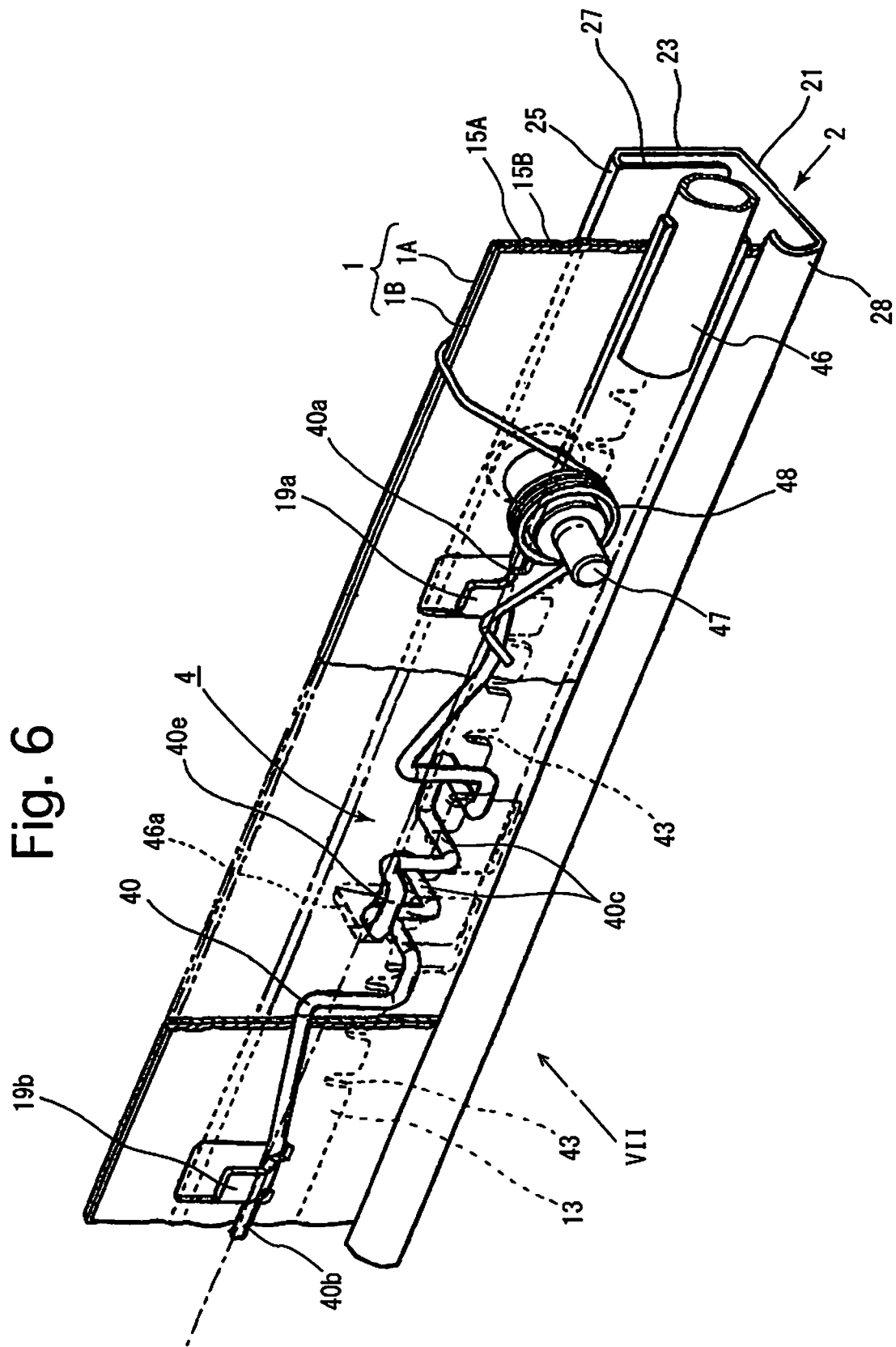
FIG. 6 is a perspective view showing the fundamental components of the seat rail device shown in FIG. 5.
Figure 7:
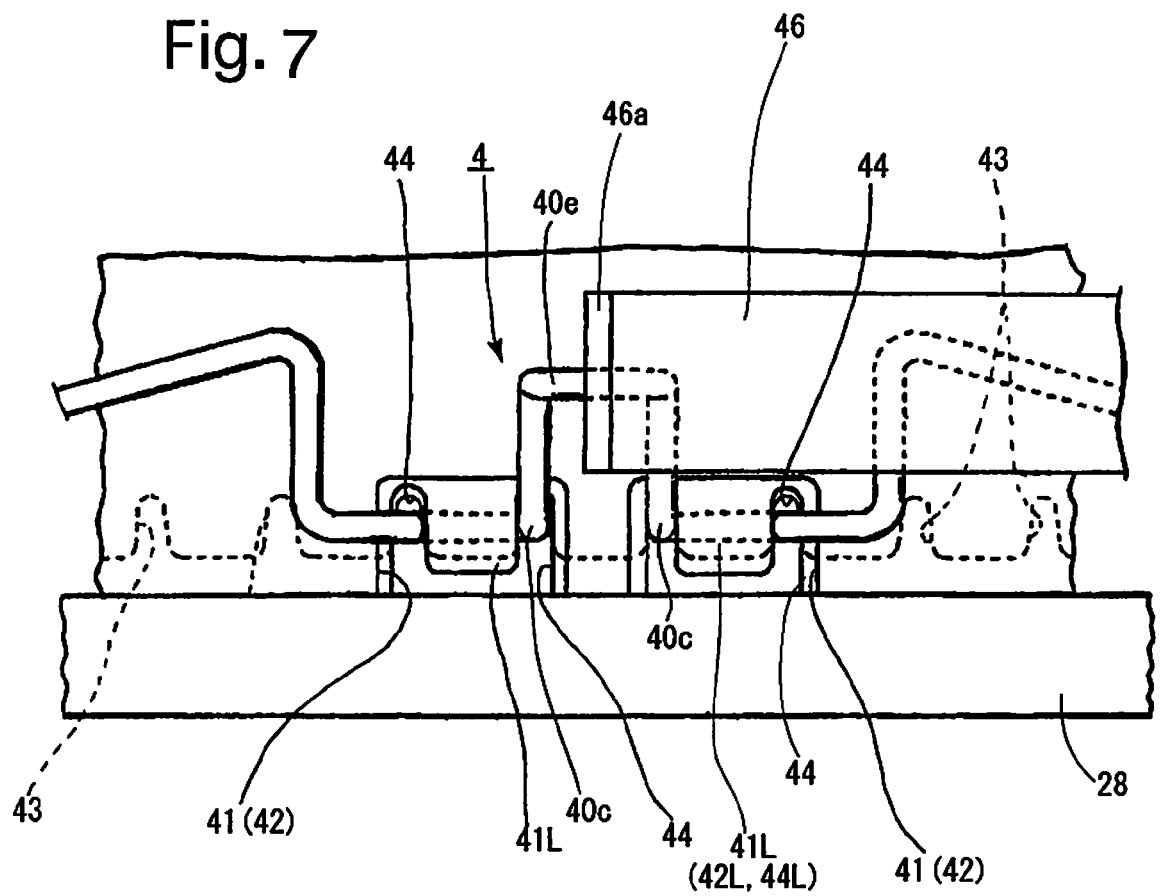
FIG. 7 is a front view viewed in a direction of an arrow VII of FIG. 5.
Figure 8:
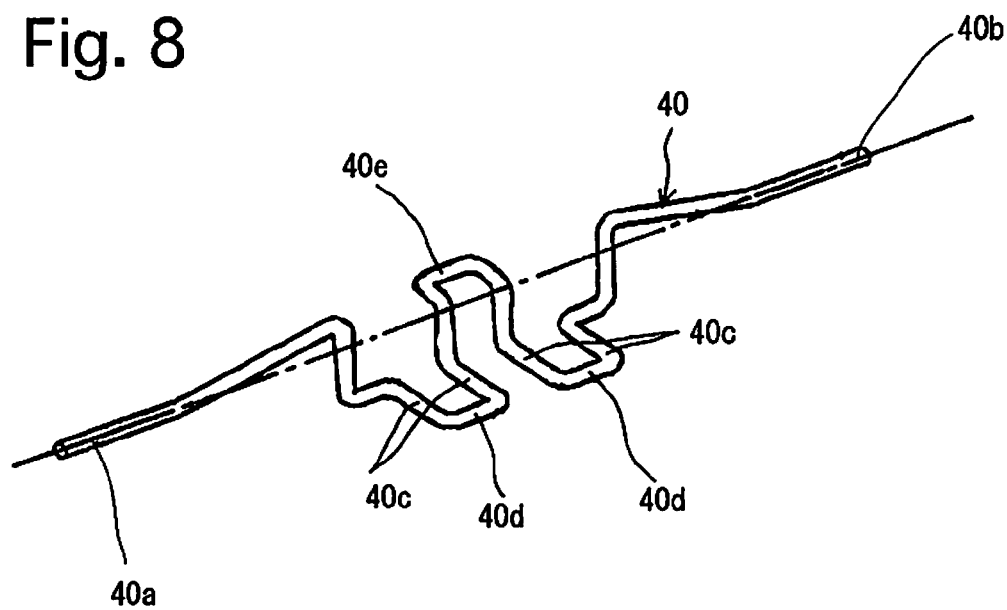
FIG. 8 is a perspective view of a linear spring of the lock mechanism.

The lock member 40 is a spring that is formed by bending a linear elastic metal body in a corrugated shape as shown in FIG. 8. Both end portions 40a and 40b of the lock member 40 are lock-engaged with holding portions 19a and 19b that are cut and raised from the second upper upright wall section 15B as shown in FIG. 6. Accordingly, the lock member 40 is mounted on the inner surface of the second upper upright wall section 15B. In other words, the lock member 40 is supported on the surface of the second upper upright wall section 15B. The lock member 40 includes a plurality of (two in the embodiment shown in the drawings) engagement protruding portions 40c protruding in a direction orthogonal to a line that connects the both end portions, and a force applying portion 40e that is positioned between the engagement protruding portions 40c and protrudes in a direction opposite to the direction of the engagement protruding portions 40c. The number of the proximal through-holes 41 and 42 and the distal through-holes 44 (the lock pieces 41L, 42L, and 44L) are determined according to the number of the engagement protruding portions 40c of the lock member 40, and the height positions of the proximal through-holes and the distal through-hole are the same as those of the lock-engagement sections 43. The engagement protruding portions 40c are inserted into the proximal through-holes 41 and 42 of the upper upright wall section 15A and the second upper upright wall section 15B (are lock-engaged with the lock pieces 41L and 42L), are engaged with the notches of the lower end of the lower downwardly hanging section 27 (the lock-engagement sections 43), and are inserted into the distal through-holes 44 of the upper wall section 13 (are lock-engaged with the lock pieces 44L). In other words, both side portions of a portion, which is supported by members of the lower rail (the notch end faces of the lock-engagement sections 43 of the lower downwardly hanging section 27) in the longitudinal direction of the engagement protruding portion 40c, are supported (supported at three points) by members of the upper rail 1 (the inner wall surfaces of the proximal through-hole 41 of the second upper upright wall section 15B and the proximal through-hole 42 of the upper upright wall section 15A, and the inner wall surfaces of the distal through-holes 44 of the upper wall section 13). Accordingly, a stable lock is achieved. It should be noted that directions from which the lock member 40 is viewed in FIGS. 6, 7, and 8 differ from each other.

The position of each of the holding portions 19a and 19b of the upper rail 1 is set to a position higher than the highest portion of the second top wall section 28b of the lower rail 2. Accordingly, even after the upper rail 1 is mounted on the lower rail 2, the holding portions 19a and 19b are exposed without being hidden behind the second top wall section 28b. For this reason, even after the upper rail 1 is mounted on the lower rail 2, a process for mounting the lock member 40 on the holding portions 19a and 19b that are formed on the inner surface of the second upper upright wall section 15B, generally a manual process, can be easily performed.

Namely, the cross-sections of both the upper and lower rails 1 and 2 are symmetric in the prior art, whereas, in the present structure, the height of the lower locking section 28 is set at a height by which the lock member 40 can be mounted on the upper rail 1 above the lower locking section. In other words, the greater part of a portion of the inner surface, which corresponds to a portion of the outer surface of the upper upright wall section 15 hidden behind the lower wall section 23, is exposed without being hidden. Therefore, this results in the facilitation of performing a subsequent process on the inner surface of the upper upright wall section 15. Such a subsequent process can be, for example, a process for mounting the lock member 40 after mounting the upper rail 1 on the lower rail 2. In this case, there is also the effect of easily and efficiently automating the process for mounting the upper rail 1 on the lower rail 2.

Furthermore, since it is relatively easy to automate the process for mounting the upper rail 1 on the lower rail 2, the efficiency of the entire process can be improved by performing a manual process for mounting the lock member 40 after the upper rail 1 is mounted on the lower rail 2 by an automated process.

Note that when the engagement protruding portions 40c are inserted into the proximal through-holes 41 and 42 and the distal through-holes 44, end-connecting sections 40d that connect the ends of the adjacent engagement protruding portions 40c and 40c pass through the lower gaps of the lock pieces 41L, 42L, and 44L, which are formed so as to hang downward from the inner surface of the upper walls of the proximal through-holes 41, 42, and 44 into the through-holes, respectively, by slightly pushing the lock member (spring) 40 down. Furthermore, when the lock member is released from being pushed down after the insertion thereof, the engagement protruding portions 40c and the end-connecting sections 40d return to the upper positions by a spring force; accordingly, thereafter, the end-connecting sections 40d are lock-engaged with the lock pieces 44L of the distal through-holes 44 so that the end-connecting sections are prevented from falling out. For this reason, a locked state can be reliably maintained.

Lock release and lock will be described.

Figure 9:
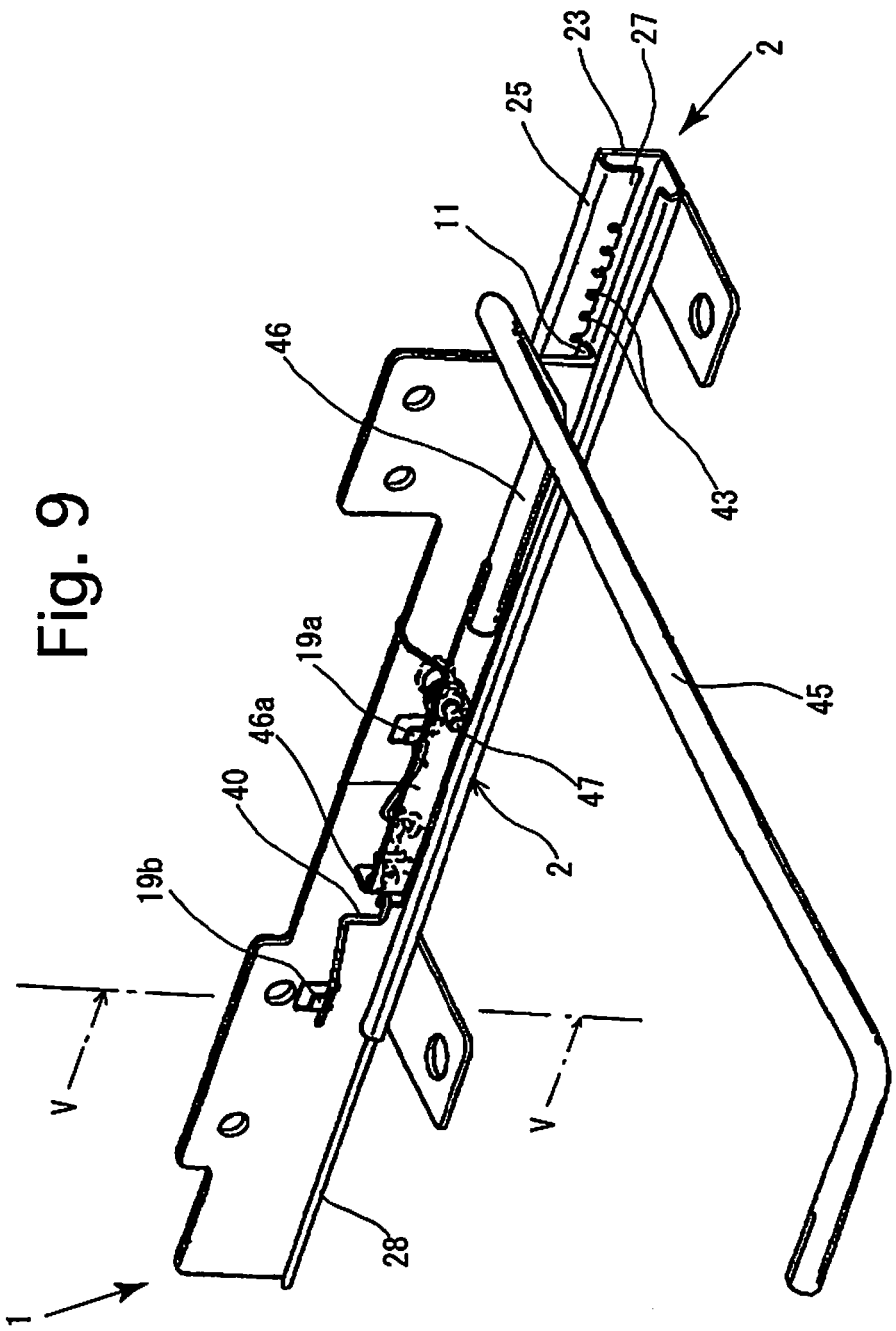
FIG. 9 is a perspective view of the seat rail device shown in FIGS. 5 and 6.

If a handle 45 shown in FIG. 9 is lifted up, a release lever 46 linked to the handle 45 is rotated about a pin 47 in a counter-clockwise direction in FIG. 9. Accordingly, a portion of the release lever 46, which is positioned on the side opposite to the handle with respect to the pin 47, is moved down so that an end portion 46a (see FIGS. 5 to 7) of the release lever pushes a middle portion (force applying portion) 40e of the lock member (spring) 40 down. Therefore, the engagement protruding portions 40c of the lock member (spring) 40 are moved down, so that the engagement protruding portions are disengaged downward from the lock-engagement sections 43 of the lower downwardly hanging section 27 of the lower rail 2. Namely, lock is released.

Thereafter, if the lifted handle 45 is released, the lock member (spring) 40 returns to an original state due to the spring force of the lock member 40. Namely, the engagement protruding portions 40c of the lock member (spring) 40 are moved up, enter the lock-engagement sections 43 of the lower downwardly hanging section 27 of the lower rail 2, and enter an engaged state (locked state) again. Note that a spring 48 wound around the pin 47 applies a biasing force that always lightly presses the lock member (spring) 40.

In the above description, the lock member 40 has been a linear spring as shown in FIG. 8. However, a well-known lock member may be used instead of the spring 40. For example, a lock member having a lock claw can be swingably supported on the second upper upright wall section 15B of the upper rail 1 by a rotating shaft or the like, and may be locked by being inserted into the through-hole of the upper upright wall section 15A, the downward opened notch or the through-hole of the lower downwardly hanging section 27, and the through-hole of the upper wall section 13.

If a spring that is formed by bending a linear elastic metal body into a corrugated shape is used as the lock member like in the above-mentioned embodiment, the engagement protruding portions 40c of the spring 40 are reliably pressed against the notch end faces of the lock-engagement sections 43 by the spring force and snuggly come into close contact with the notch end surfaces of the lock-engagement sections. Accordingly, this structure has an effect of generating no play in the locked state.

Furthermore, if the linear elastic body has a circular cross-section, the diameter of the engagement protruding portion 40c can be small while securing strength. Accordingly, the pitch of the lock-engagement sections 43 can be small in the longitudinal direction of the rail while securing a required lock strength. Namely, the interval of the lock positions can be narrowed.

Figure 10:
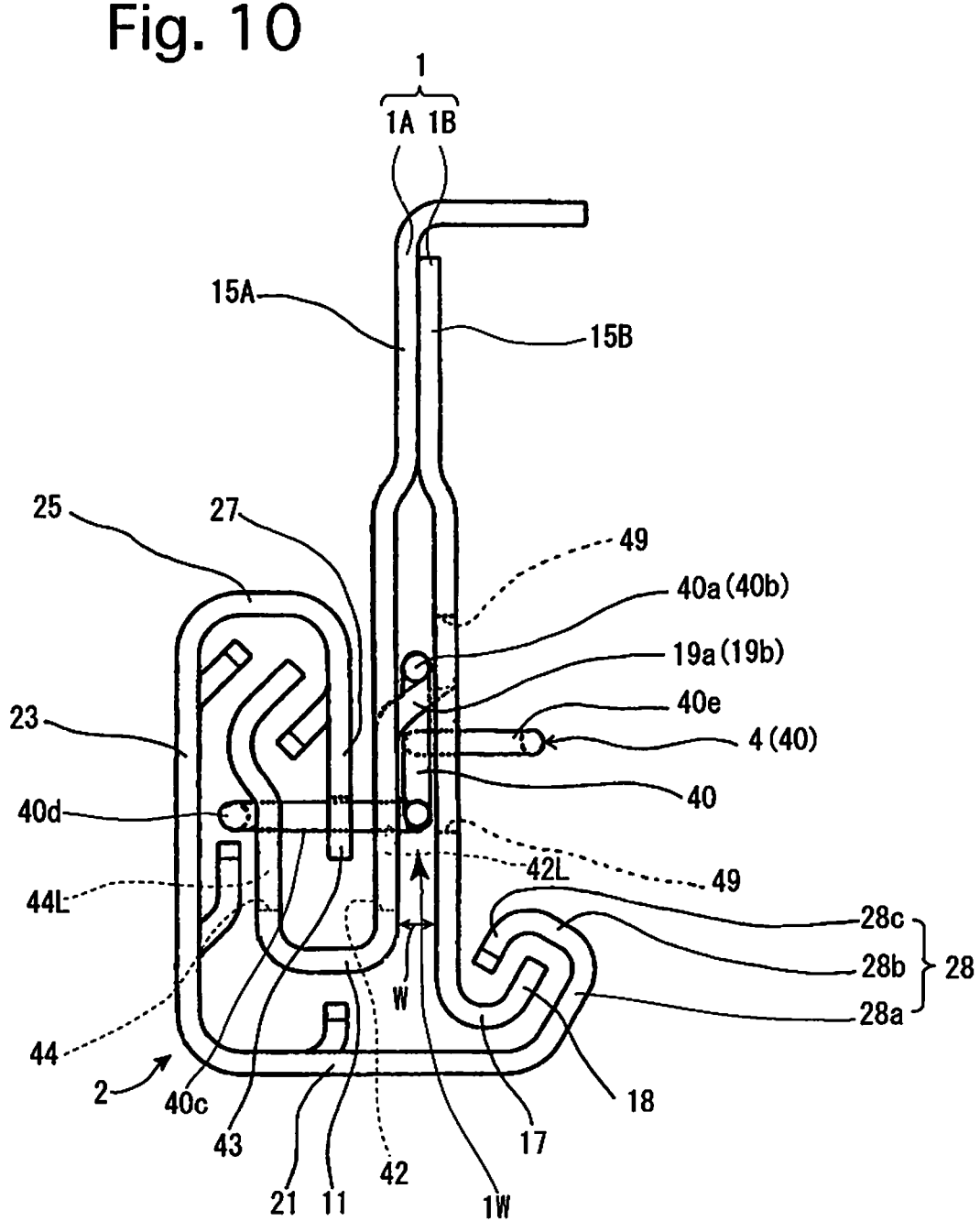
FIG. 10 is a cross-sectional view showing fundamental components and illustrating another embodiment of the seat rail device that includes the lock mechanism of the invention.
Figure 11A:
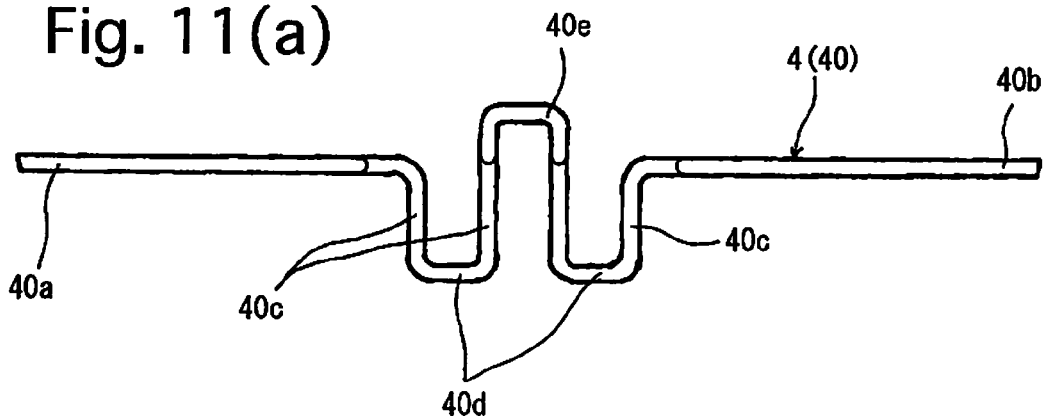
FIG. 11(*a*) is a plan view of a lock member (spring) that is used in the seat rail device shown in FIG. 10, FIG. 11(*b*) is a front view of the lock member, and FIG. 11(*c*) is a perspective view of the lock member.
Figure 11B:
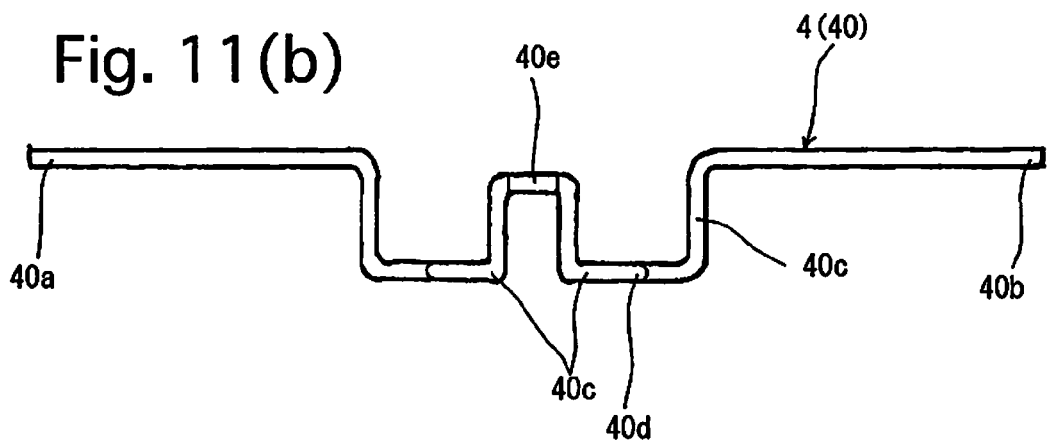
Figure 11C:
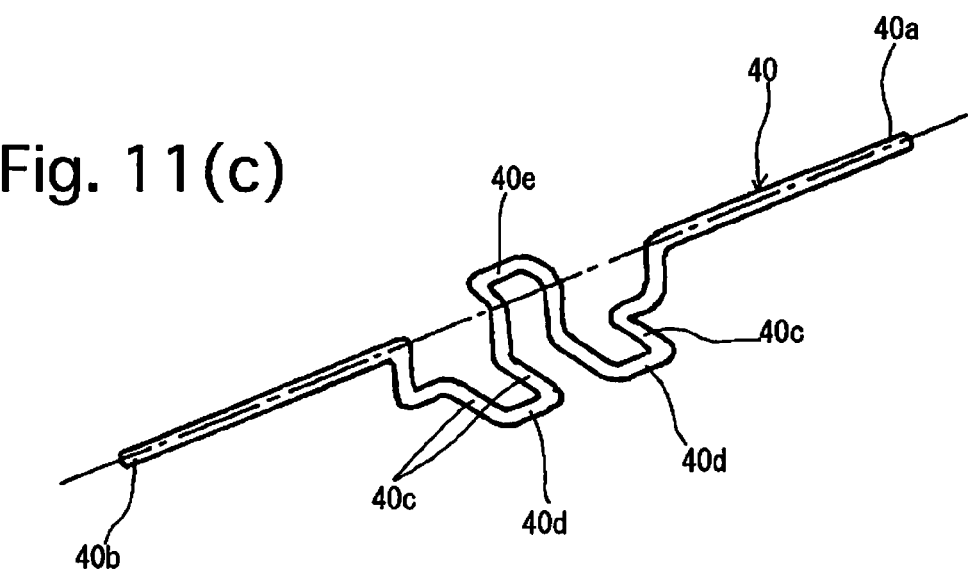
Figure 12:
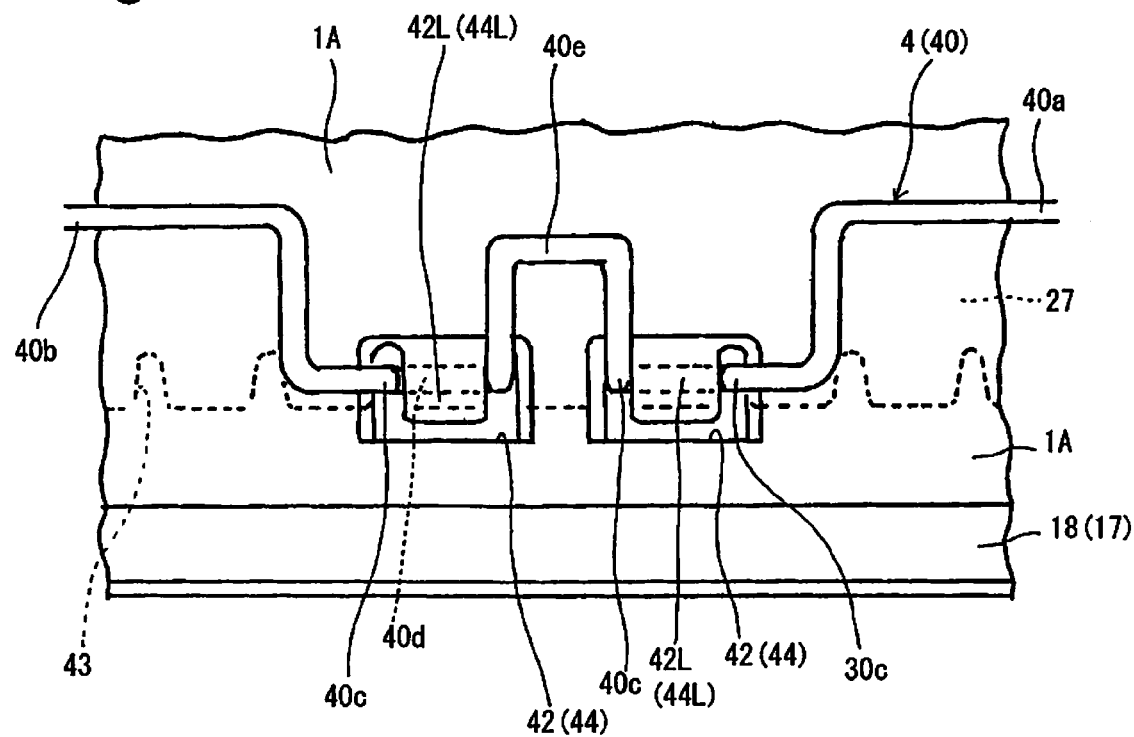
FIG. 12 is a right side view of FIG. 10 from which a second plate is removed.
Figure 13:
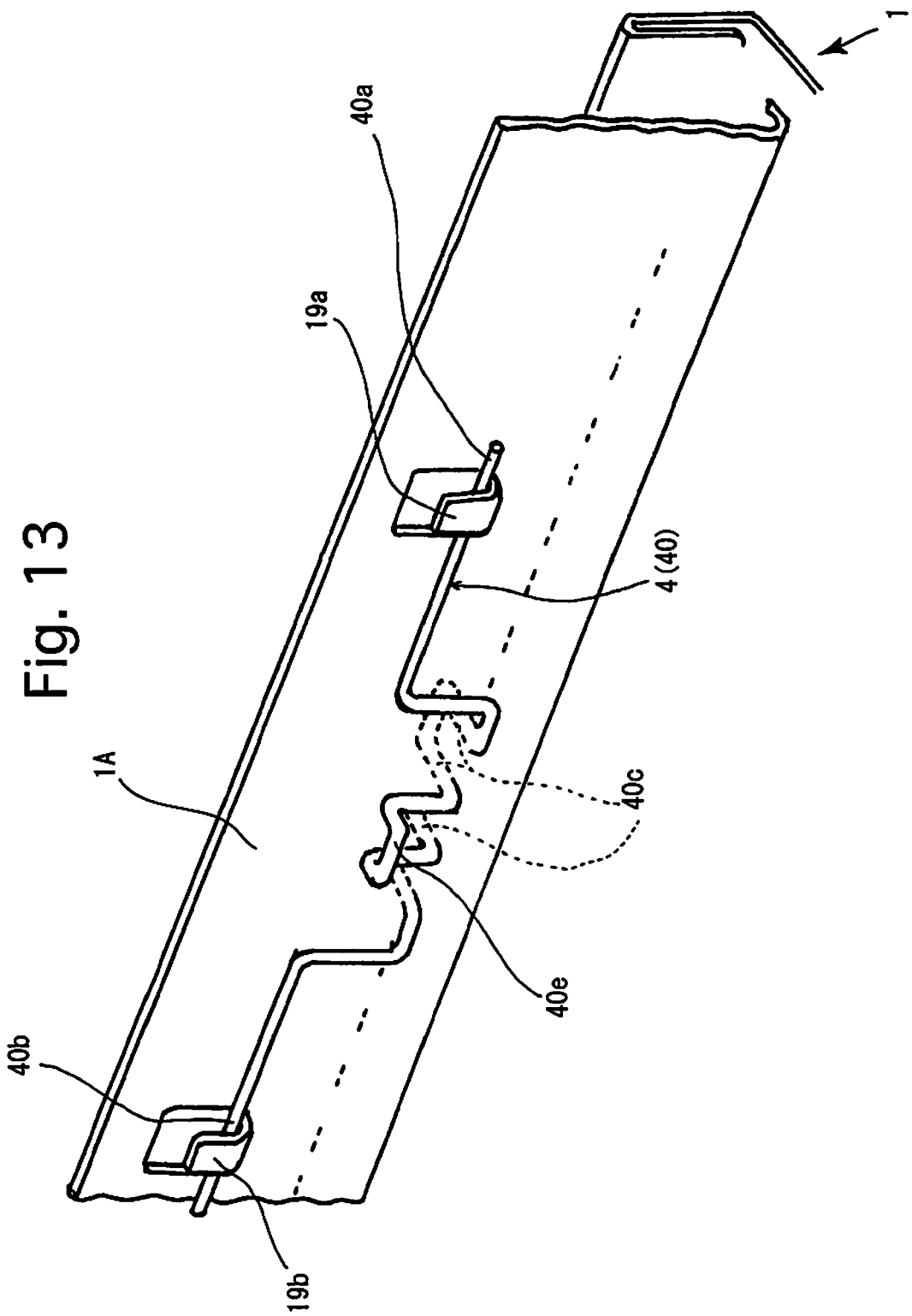
FIG. 13 is a perspective view of FIG. 10 from which the second plate is removed.

FIGS. 10 to 13 show another embodiment of the seat rail device according to the invention. In this embodiment, as shown in FIG. 10, only upper portions of the second upper upright wall section 15B and the upper upright wall section 15A of the upper rail 1 having the structure described in FIG. 1 are joined to each other, a lock member receiving space 1W having a width W is formed at the lower portions thereof, and a lock member (spring) 40 of a lock mechanism 4 is inserted into the space 1W.

The basic structure of the lock member (spring) 40 is the same as that of the embodiment shown in FIGS. 5 to 9, and the same components are denoted by the same reference numerals. Since the lock member 40 is received in the lock member receiving space 1W formed at the lower portions of the upper upright wall section 15A and the second upper upright wall section 15B in this embodiment, an operational through-hole 49 (FIG. 10) through which the force applying portion 40e of the lock member 40 protrudes and is movable is formed in the second upper upright wall section 15B of the upper rail 1. Holding portions 19a and 19b, which are cut and raised so as to protrude from the inner surface of the upper upright wall section and hold both the end portions 40a and 40b of the lock member 40, are formed at the upper upright wall section 15A. Namely, the lock member 40 is supported on the inner surface of the first plate 1A. The holding portions 19a and 19b may be formed at the second upper upright wall section 15B like in the embodiment shown in FIGS. 5 to 9.

Like in the embodiment shown in FIGS. 5 to 9, in this embodiment, a proximal through-hole 42 is formed at the upper upright wall section 15A of the upper rail 1; lock-engagement sections 43 formed of a plurality of notches, which are formed at regular intervals in the longitudinal direction of a rail, are formed at the lower end of a lower downwardly hanging section 27 of a lower rail 2; and distal through-holes 44 are formed at an upper wall section 13 of the upper rail 1. The proximal through-hole 42 and the distal through-hole 44 are formed in a U shape (a reverse U shape) that has a lower side and left and right sides. Lock pieces 42L and 44L, which hang downward from above, are formed in the through-holes. A lock piece is not formed in the operational through-hole 49 of the second upper upright wall section 15B.

A force applying portion 40e of the lock member 4 is led to the outside of the rail through the force applying portion through-hole 49 that is formed at the second upper upright wall section 15B. A member such as a lock release handle (not shown) is linked to this led portion. Accordingly, a locked state can be released by an operation performed externally. Since the position (height) of the force applying portion through-hole 49 is higher than that of the second top wall section 28b or the lower downwardly hanging section 27 of the lower rail 2, the second upper upright wall section is opened near the force applying portion 40e led from the force applying portion through-hole 49. For example, since a member such as a lock release handle can be easily attached to the force applying portion 40e later, the degree of freedom of the process is increased.

The operation of this embodiment is basically the same as that of the embodiment shown in FIGS. 5 to 9. Namely, when the force applying portion 40e, which is led from the force applying portion through-hole 49, is pushed down, the entire middle portion of the lock member 4 is pushed down. As a result, the engagement portions 40c are disengaged downward from the lock-engagement sections 43, so that the locked state is released. Furthermore, when the force applying portion 40e is stopped being pushed down, the entire portion including the middle portion of the lock member 4 returns to an original position due to an elastic (spring) force. As a result, the engagement portions 40c are engaged with the lock-engagement sections 43 and are in the locked state again. Since the engagement portions 40c are lock-engaged with the lock piece 42L of the proximal through-hole 42 and the lock pieces 44L of the distal through-holes 44 in this locked state, the lock member is lock-engaged at three points, i.e., the upper wall section 13 of the upper rail 1, the lower downwardly hanging section 27 of the lower rail 2, and the upper upright wall section 15B of the upper rail 1. Accordingly, the locked state can be reliably maintained.

Figure 14:
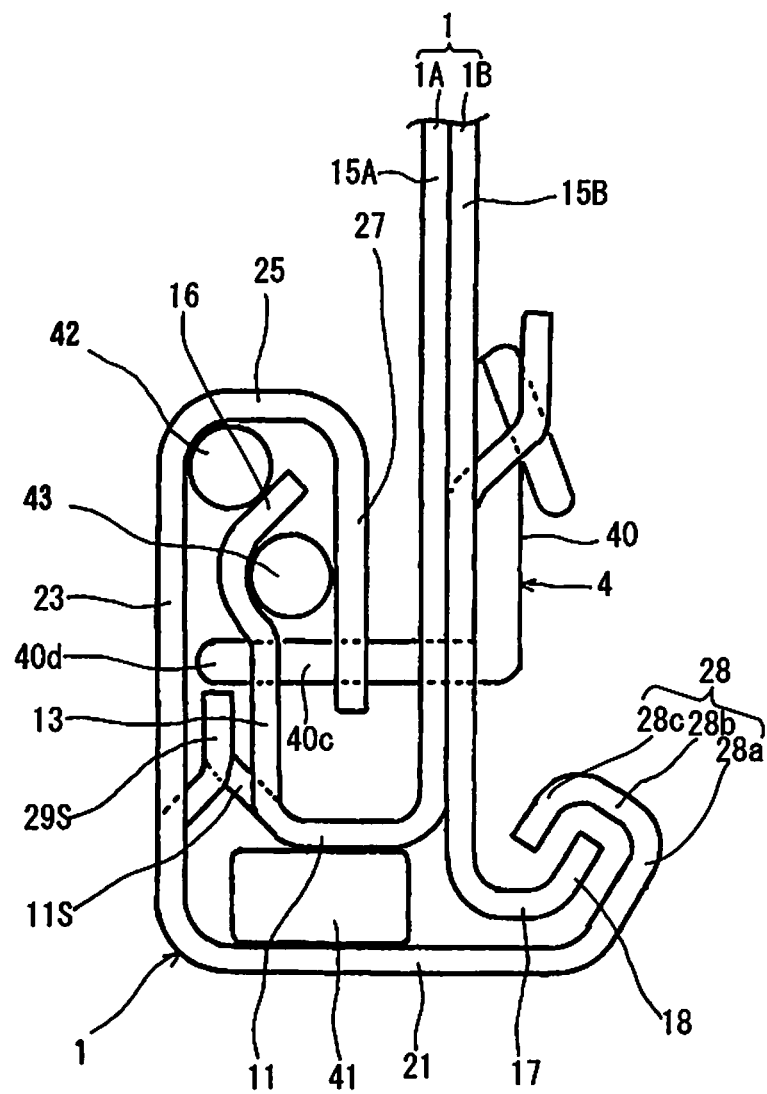
FIG. 14 is a cross-sectional view taken along a line XIV-XIV of FIG. 15 and illustrating an embodiment of a seat rail device that includes a stopper mechanism of the invention.
Figure 15:
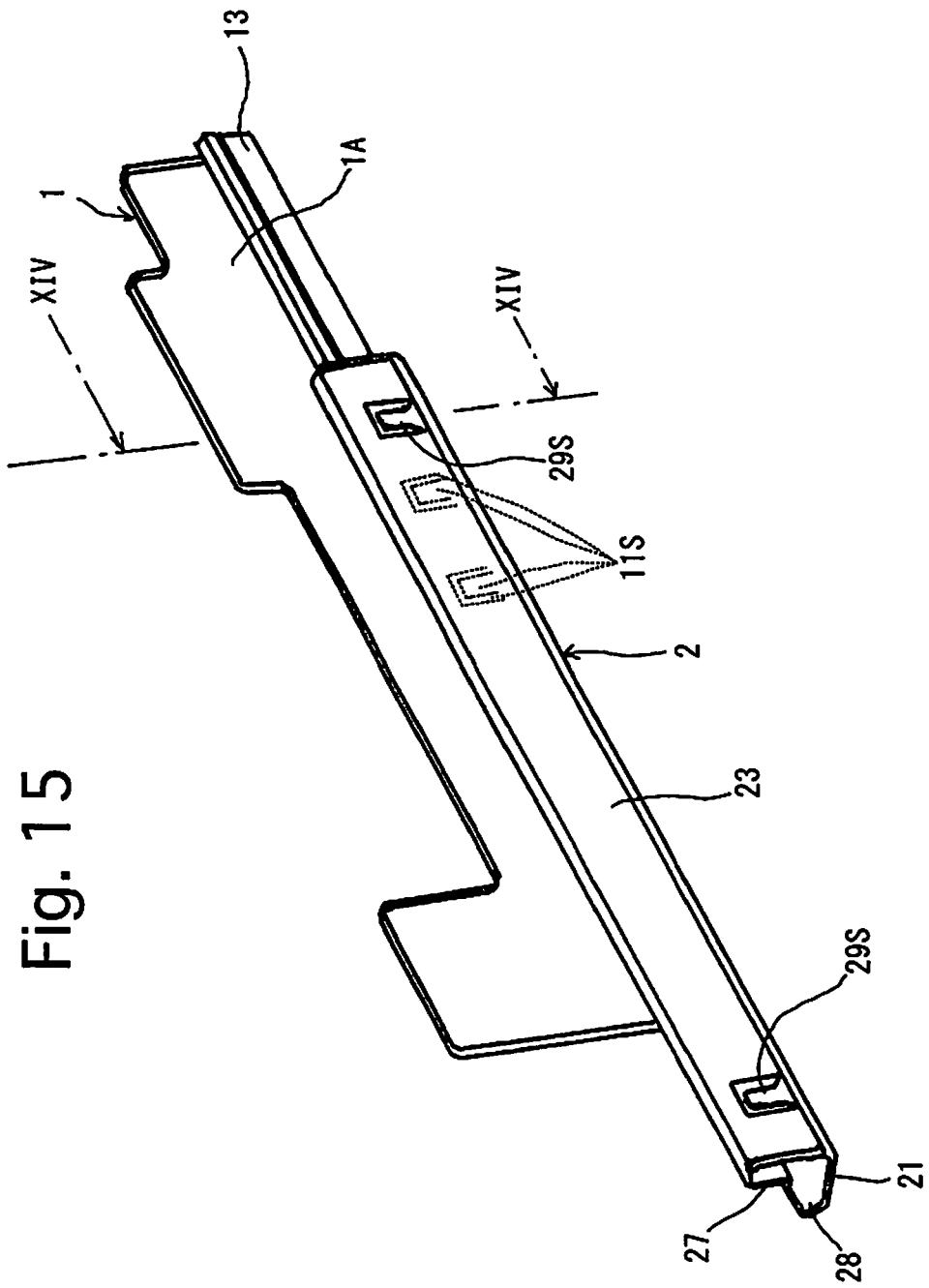
FIG. 15 is a perspective view showing fundamental components of the seat rail device.

FIGS. 14 and 15 show another embodiment of the seat rail device according to the invention. In this embodiment, stoppers for restricting front and rear moving ends of an upper rail 1 are formed at upper and lower rails 1 and 2. As for the upper and lower rails 1 and 2, the same components are denoted by the same reference numerals and the description thereof will not be repeated.

In this embodiment, stopper pieces 29S, which are cut and raised so as to protrude toward the inner side (the right side in FIG. 14) from the inner wall surface of a lower wall section 23, are formed at positions that are lower than the lower end of a lower downwardly hanging section 27 near both ends of the lower wall section 23 of the lower rail 2 in the longitudinal direction of the rail. More precisely, protruding pieces are firstly cut and raised so as to protrude toward the outer side (the left side in FIG. 14) from the outer wall surface of the lower wall section 23, and the upper rail 1 is mounted on the lower rail 2. Thereafter, the protruding pieces are pressed toward the inner side (the right side in FIG. 14) from the outer side (the left side in FIG. 14) so as to protrude toward the inner side from the inner wall surface of the lower wall section 23, thereby forming the protruding pieces (stoppers) 29S. Note that it is sufficient for the position (installation base) of the stopper pieces 29S in a height direction to be lower than the lower end of the lower downwardly hanging section 27 during the above-mentioned process. After this process, for example, the end portion or the like of the stopper pieces 29S does not necessarily have to be lower than the lower end of the lower downwardly hanging section 27. A processed portion, which corresponds to a portion satisfying the above-mentioned request during the process, is the installation base.

Protrusions (locking sections) 11S, which are formed by cutting and raising the end portions of the upper bottom wall section 11, bending the end portions upward at an obtuse angle as shown in FIG. 14 and further bending the end portions upward, are respectively formed at the upper bottom wall section 11 of the upper rail 1 at two substantially middle positions in the longitudinal direction of the rail. The locking sections 11S are lock-engaged with the stopper piece 29S of the lower rail 2 so that the movement of the upper rail 1 is restricted at that position.

Note that the protrusions (locking sections) 11S do not necessarily need to be cut and raised from the outer end of the upper bottom wall section 11. For example, the protrusions 11S may be cut and raised from the middle portion of the upper wall section 13, or may be formed by mounting separate members. Namely, the locking section 11S may be formed at a position where the locking section can be lock-engaged with the stopper 29S.

Figure 16:
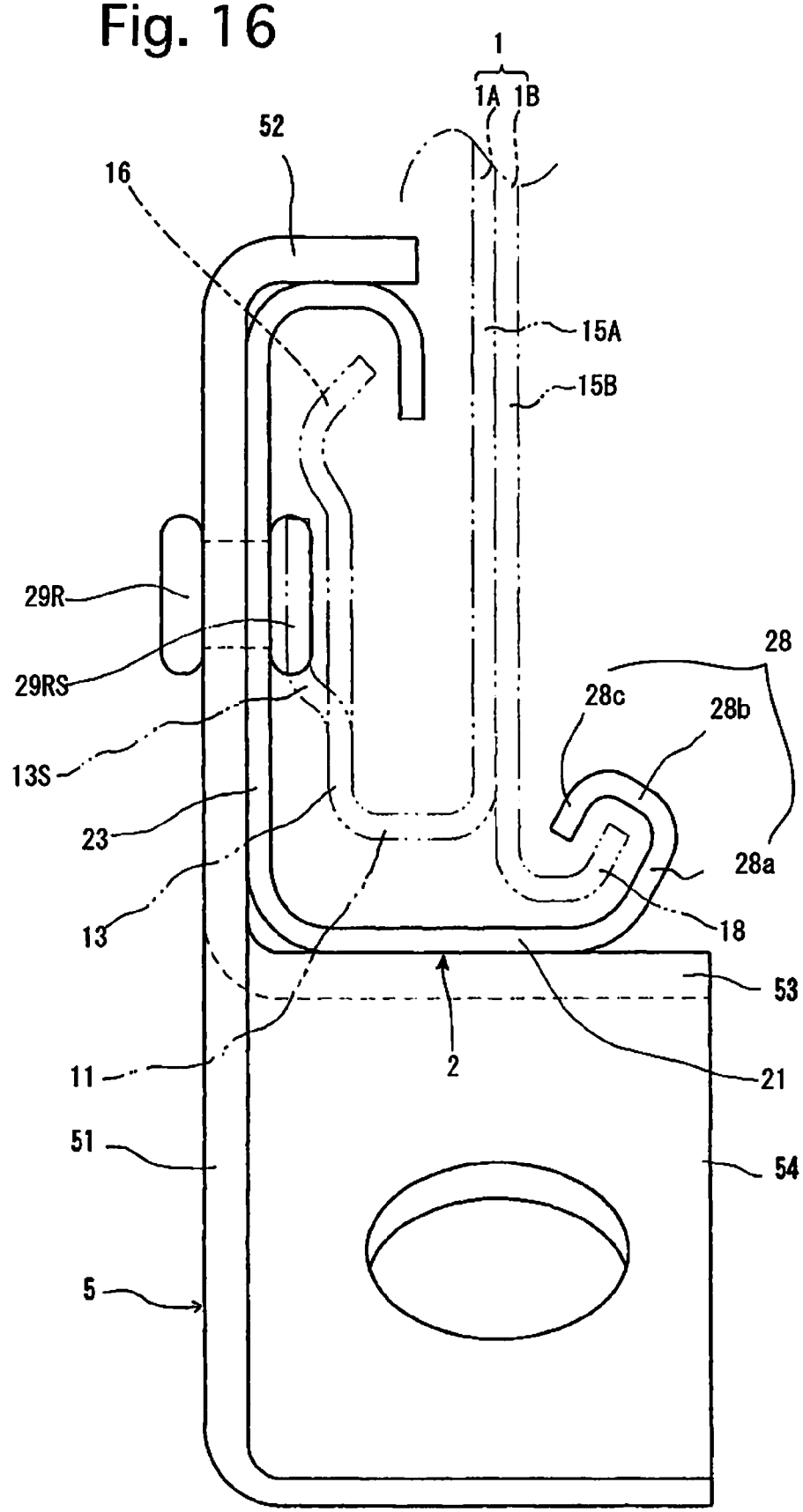
FIG. 16 is a cross-sectional view showing fundamental components and illustrating another embodiment of the seat rail device that includes the stopper mechanism of the invention.
Figure 17:
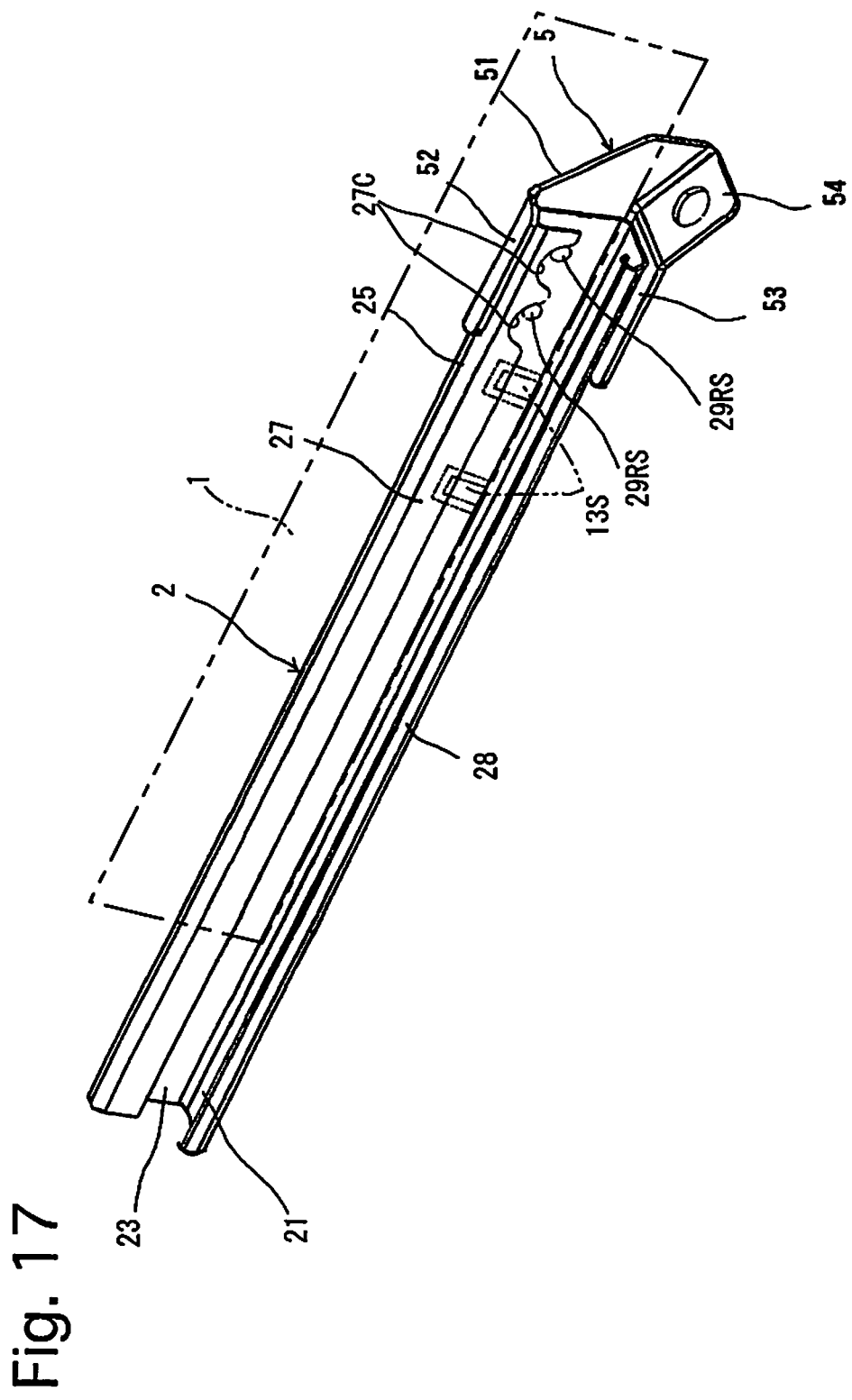
FIG. 17 is a perspective view showing the fundamental components.
Figure 18:
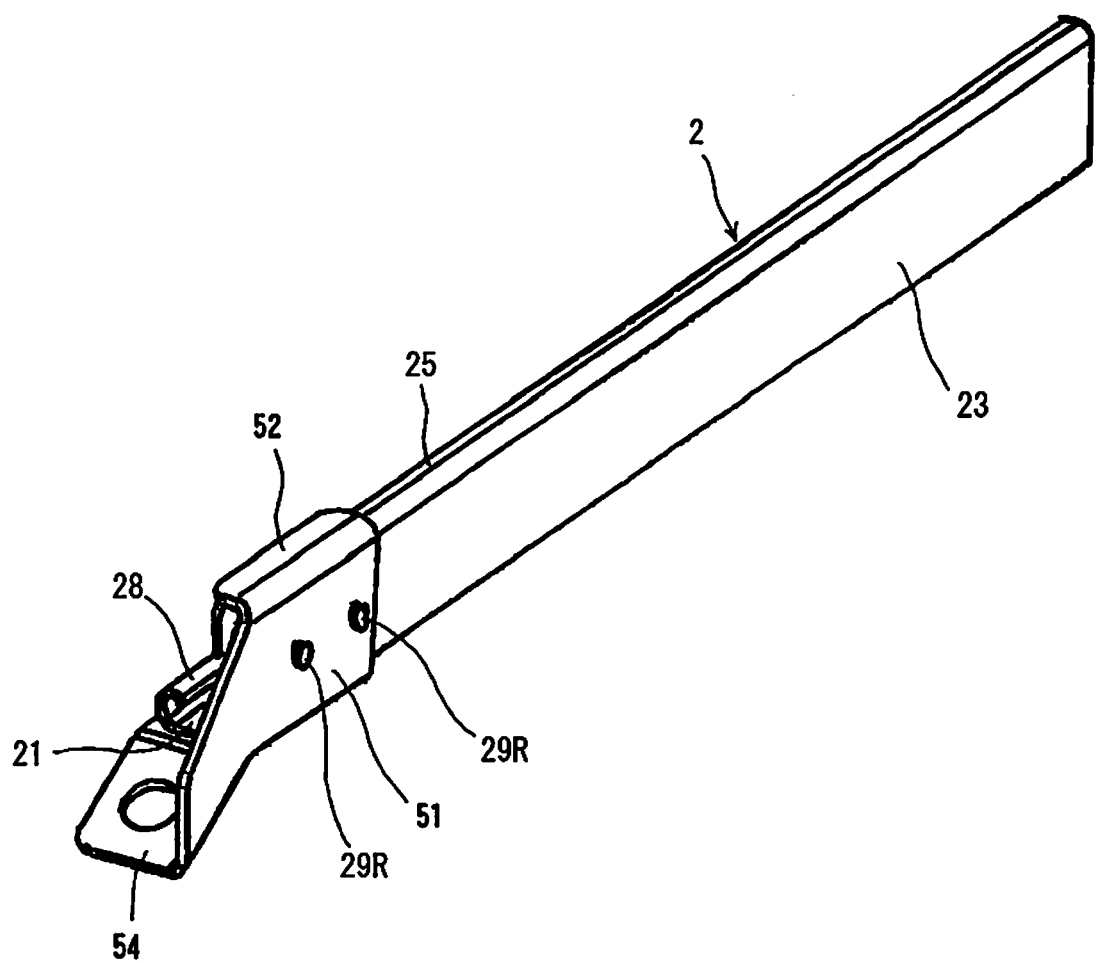
FIG. 18 is a perspective view showing the fundamental components.

FIGS. 16 to 18 show another embodiment of the seat rail device including stoppers. This embodiment is different from the embodiment shown in FIGS. 14 and 15 in the following respects: stoppers are formed by rivets 29R for fixing a leg bracket 5, which fixes a lower rail 2 to a floor surface, to a lower rail 12 and locking sections are formed by protrusions 13S that are cut and raised from the middle portion of the upper wall section 13 rather than an outer end of the upper bottom wall section 11 of the upper rail 1. Since the structures of other portions are the same as those of the first embodiment, the same components are denoted by the same reference numerals and the description thereof will not be repeated.

In the embodiment shown in FIGS. 16 to 18, an upright plate section 51 of a leg bracket 5 is fixed to the outer surface of a lower wall section 23 by rivets 29R that pass through the lower wall section 23 of a lower rail 2. Reference numeral 54 denotes a base of the leg bracket 5, and the base is mounted on the floor surface of an automobile. Furthermore, reference numeral 53 denotes a lower plate section, and reference numeral 52 denotes an upper plate section. The leg bracket is fixed by the rivets 29R and the lower rail 1 is interposed between the upper and lower plate sections 52 and 53, so that the leg bracket is reliably mounted. Note that the rivets 29R are caulked by being pressed from both sides (the inner wall surface of the lower wall section 23 and the outer surface of the upright plate section 51 of the leg bracket) after being fixed.

Portions 29RS of the rivets 29R, which protrude from the inner wall surface of the lower wall section 23, are portions functioning as stoppers. Namely, these portions 29RS act so as to restrict the movement of the upper rail 1 by being lock-engaged with the protrusions 13S that are cut and raised from the middle portion of the upper wall section 13 of the upper rail 1 toward the outer side (the left side in FIG. 16).

Note that the argument that the height of the rivet 29R and the height of the protrusion 13S are the same as those of the stopper pieces 29S and the protrusions 11S still holds.

Furthermore, in the embodiment shown in FIG. 17, the lower end of the lower downwardly hanging section 27 of the lower rail 2 is cut out, and the rivets 29R are provided at portions exposed through cut-out portions 27C. In other words, the rivets 29R are provided at positions higher than the original lower end of the lower downwardly hanging section 27. In this specification, in such a case, the height of the cut-out end surface (the end face of the cut-out portions 27C) is referred to as the "height of the lower downwardly hanging section 27" rather than the height of the original lower end of the lower downwardly hanging section 27. Namely, the portions where stoppers 29S are to be formed on the side corresponding to the inner wall surface of the lower wall section 23 (the right side in FIGS. 14 and 16) are only required not to be hidden by the lower downwardly hanging section 27.

Note that rivets for mounting the leg bracket 5 have been described as the rivets in the above description. However, the rivets are not limited thereto, and other-purpose rivets may be used as the rivets or only rivets may be mounted.

Figure 19:
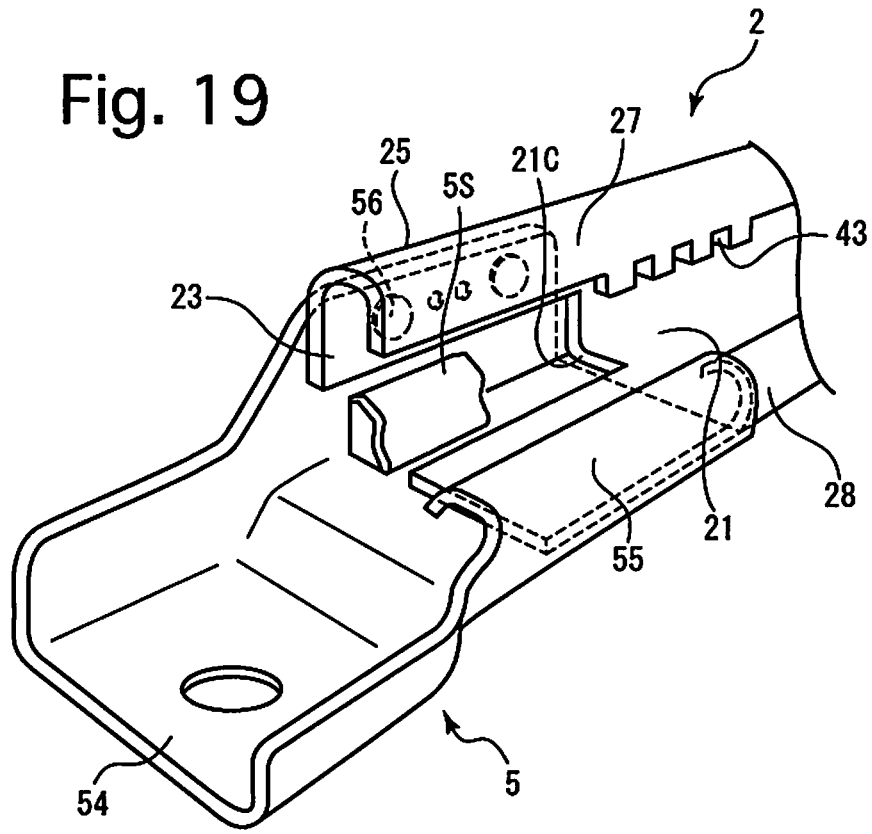
FIG. 19 is a perspective view showing fundamental components and illustrating still another embodiment of the seat rail device that includes the stopper mechanism of the invention.
Figure 20:
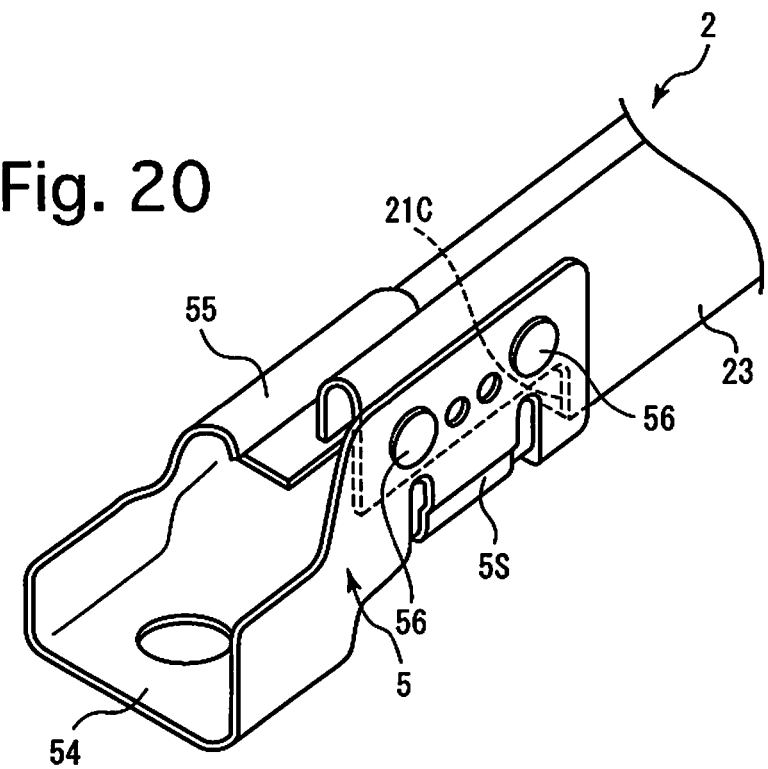
FIG. 20 is a perspective view of the fundamental components viewed in another direction.
Figure 21:
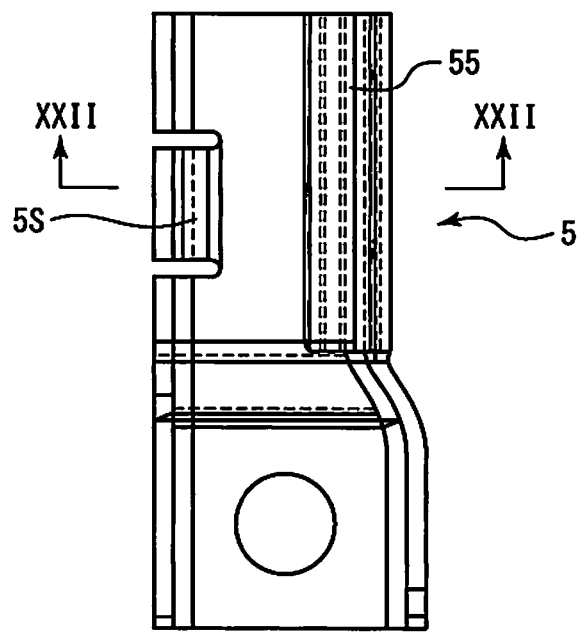
FIG. 21 is a plan view of a leg bracket of the seat rail device.
Figure 22:
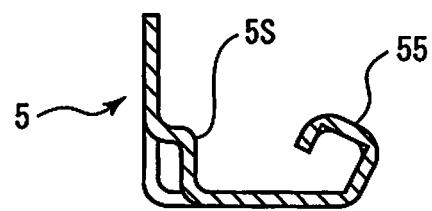
FIG. 22 is a cross-sectional view taken along a line XXII-XXII of FIG. 21 is a plan view of the leg bracket of the seat rail device.

FIGS. 19 to 22 show another embodiment of the seat rail device according to the invention. In this embodiment, a stopper 5S that restricts the front and rear moving ends of the upper rail 1 and a detach-prevention bent portion 55 that surrounds the second upper extension section 18 of the upper rail 1 are formed on a leg bracket 5 for fixing a lower rail 2 to the floor surface. As shown in FIG. 19, a cut-out portion 21C, which is formed by cutting out a part of the lower bottom wall section 21 and the lower wall section 23, is formed at an end portion of the lower rail 2. A stopper 5S, which is formed by cutting out a part of the leg bracket 5 and bending the leg bracket 5 inward, protrudes into the lower rail 2 through the cut-out portion 21C. In the embodiment shown in the drawings, the stopper 5S is formed of a piece that is cut and raised. However, the stopper may be formed onto the leg bracket 5. The leg bracket 5 and the lower rail 2 are jointed to each other above the stopper 5S by rivets 56. Furthermore, the detach-prevention bent portion 55 is positioned on the extension of the lower locking section 28 of the lower rail 2, and receives the lower locking section 28 of the lower rail 2. In FIG. 19, the lower locking section 28 is cut at the end portion facing the leg bracket 5. However, the lower locking section 28 can be inserted into the detach-prevention bent portion 55. The detach-prevention bent portion 55 has a reverse U-shaped cross-sectional shape, but may have other cross sectional shapes.

In this embodiment, the sliding end of the upper rail 1 sliding on the lower rail 2 is restricted by the stopper 5S of the leg bracket 5. Since the leg bracket 5 is generally formed of a material thicker than the lower rail 2, the sliding end of the upper rail 1 can be reliably restricted by the stopper 5S formed at the leg bracket 5. Moreover, since the detach-prevention bent portion 55 is also thick, the peeling strength of the upper rail 1 can be increased.

INDUSTRIAL APPLICABILITY

A seat rail device according to the invention can be widely applied to a seat of an automobile, and reduction in size, weight, and costs can be achieved.

DESCRIPTION OF REFERENCE NUMERALS

1: Upper rail
1A: First plate
1B: Second plate
11: Upper bottom wall section
12: Upper ridge section
12a: Outer wall surface (of upper ridge section)
12b: Inner wall surface (of an upper ridge section)
13: Upper wall section
15A: Upper upright wall section (outer upper upright wall section)
15B: Second upper upright wall section (inner upper upright wall section)
16: Upper sloped wall section
16a: Recessed groove (of upper sloped wall section)
17: Second upper bottom wall section
18: Second upper extension section
2: Lower rail
21: Lower bottom wall section 22: Lower protruding wall section
23: Lower wall section
25: Lower top plate section
26: Lower groove
26a: Upper in-groove space
26b: Lower in-groove space
27: Lower downwardly hanging section
28: Lower locking section
28a: Inner wall section
28b: Second top wall section
28c: Second downwardly hanging section
31: Roller-shaped rolling body
31a, 31b: Ball-shaped rolling body (inter-bottom-wall rolling body)
33: Upper ball-shaped rolling body
35: Lower ball-shaped rolling body
4: Lock mechanism
40: Lock member (spring)
40a 40b: Both end portions
40c: Engagement protruding portion
40d: End-connecting section
40e: Force applying portion
41, 42: Proximal through-hole
44: Distal through-hole
43: Lock-engagement section
41L, 42L, 43L: Lock piece
5: Leg bracket
5S: Stopper
55: Detach-prevention bent portion

The invention claimed is:

1. A seat rail device wherein an upper rail for supporting a seat is provided on a lower rail, rolling bodies are provided between the lower and upper rails, and the upper rail is movable along the lower rail via the rolling bodies, wherein the lower rail includes, with respect to a cross-section perpendicular to the longitudinal direction of the lower rail, a lower bottom wall section that forms a rail bottom, a lower wall section that extends upward from an outer edge of the lower bottom wall section, a lower top plate section that extends from an upper edge of the lower wall section toward an inner side above the lower bottom wall section, and a lower downwardly extending section that extends downward from an edge of the lower top plate section, wherein the upper rail includes, with respect to a cross-section perpendicular to the longitudinal direction of the upper rail, an upper upright wall section that includes a seat supporting portion formed at an upper portion thereof, an upper bottom wall section that extends toward an outer side from a lower edge of the upper upright wall section, an upper wall section that extends upward from an edge of the upper bottom wall section, and an upper sloped wall section that extends obliquely upward from an upper edge of the upper wall section, wherein the upper rail is provided above the lower rail so that the upper bottom wall section is positioned above the lower bottom wall section and the upper sloped wall section is positioned in a lower groove having a lower opening surrounded by the lower wall section, the lower top plate section, and the lower downwardly extending section, wherein an inter-bottom-wall rolling body is provided between the upper and lower bottom wall sections and is rollably supported so as to support the upper bottom wall section above the lower bottom wall section, an upper ball-shaped rolling body is provided and rollably supported in an upper in-groove space partitioned and defined by the upper sloped wall section in the lower groove, and a lower ball-shaped rolling body is provided and rollably supported in a lower in-groove space so that the upper sloped wall section is supported from both sides in the lower groove, wherein the upper sloped wall section, which extends obliquely upward from the upper edge of the upper wall section, extends in a direction toward the lower downwardly extending section and away from the lower wall section, and wherein the upper in-groove space is defined as a space surrounded by the lower wall section, the lower top plate section, and the upper sloped wall section, and the lower groove space is defined as a space surrounded by the lower downwardly extending section and the upper sloped wall section.

2. The seat rail device according to claim 1, wherein a recessed groove that is recessed toward an upper surface of the upper sloped wall section is formed on a lower surface of the upper sloped wall section and/or a recessed groove that is recessed toward an outer surface of the lower downwardly extending section is formed on an inner surface of the lower downwardly extending section, so that the lower ball-shaped rolling body is received in the formed recessed groove and is rollably supported without falling out.

3. The seat rail device according to claim 1, wherein the inter-bottom-wall rolling body is a roller-shaped rolling body.

4. The seat rail device according to claim 1, wherein the upper rail further includes a second upper bottom wall section that extends toward the inner side from the lower edge of the upper upright wall section, and a second upper extension section that extends upward from an edge of the second upper bottom wall section, and wherein the lower rail further includes a lower locking section that is folded so as to surround the second upper extension section and extends from the inner edge of the lower bottom wall section while maintaining a predetermined gap between said lower locking section and the second upper bottom wall section and the second upper extension section.

5. The seat rail device according to claim 4, wherein the second upper extension section extends obliquely upward from the edge of the second upper bottom wall section so as to form an obtuse angle.

6. The seat rail device according to claim 4, wherein a height of the lower locking section, which is folded so as to surround the second upper extension section, is lower than that of a lower edge of the lower downwardly extending section.

7. The seat rail device according to claim 4, wherein the upper upright wall section, the upper bottom wall section, the upper wall section, and the upper sloped wall section are formed on a first plate, and wherein the second upper bottom wall section and the second upper extension section are formed on a second plate, and wherein the second plate further includes a second upper upright wall section which extends along the upper upright wall section of the first plate.

8. The seat rail device according to claim 1, further comprising:

a lock mechanism that restricts the movement of the upper and lower rails, wherein the lock mechanism includes a lock member that includes engagement protruding portions and is supported on the inner surface of the upper upright wall section of the upper rail, proximal through-holes that are formed in the upper upright wall section of the upper rail, and lock-engagement sections that are formed at the lower downwardly extending section of the lower rail, wherein the upper rail is locked in a movement prohibition state when the engagement protruding portions of the lock member are engaged with the lock-engagement sections while being inserted into the proximal through-holes.

9. The seat rail device according to claim 8, wherein the lower rail comprises an inner wall section on the inside of the lower bottom wall section, wherein a height of the inner wall section is set to a height so that the lock member is mounted on the upper rail above the inner wall section, and wherein the height of the inner wall section is set lower than that of the lower end of the lower downwardly extending section.

10. The seat rail device according to claim 9, wherein the lower rail further includes a lower locking section that includes a second top wall section extending toward the outer side from an end edge of the inner wall section so as to have a height lower than the lower end of the lower downwardly extending section, and a second downwardly extending section extending toward the lower bottom wall section from an end edge of the second top wall section, wherein the upper rail includes the upper upright wall section provided on the outer side and the second upper upright wall section provided on the inner side, wherein the upper upright wall section and the second upper upright wall section are parallel to each other, and wherein the second upper bottom wall section extends from the second upper upright wall section that is formed on the inner side, wherein the upper rail further includes a second upper bottom wall section and a second upper extension section which extends upward from an end edge of the second upper bottom wall section, wherein an end edge of said second upper extension section is positioned in the lower locking section, and wherein the lock member is supported on the inner surface of the second upper upright wall section.

11. The seat rail device according to claim 8, wherein the lock mechanism further includes distal through-holes formed in the upper wall section, and wherein the upper rail is locked in a movement prohibition state when the engagement protruding portions of the lock member are engaged with the lock-engagement sections and are inserted into the distal through-holes while being inserted into the proximal through-holes.

12. The seat rail device according to claim 8, wherein the lock member comprises a spring formed by bending a linear elastic body in a corrugated shape so that the engagement protruding portions are formed, both ends of the lock member are supported on a surface of the upper upright wall section, wherein the lock-engagement sections are formed by cutting the lower end edge of the lower downwardly extending section in a corrugated shape, wherein, when a middle portion of the spring is pressed and moved down, the engagement protruding portions are disengaged from the lock-engagement sections and a locked state thereof is released, and when the middle portion of the spring is not pressed down, the spring returns due to a spring force and the engagement protruding portions are engaged with the lock-engagement sections so as to enter into a locked state.

13. The seat rail device according to claim 12, wherein the proximal through-holes formed at the upper upright wall section and the distal through-holes formed at the upper wall section include lock pieces that extend downward from the inner surfaces of upper wall portions of the proximal through-holes and the distal through-holes in to the through-holes.

14. The seat rail device according to claim 4, wherein the width of the upper bottom wall section of the upper rail is larger than that of the second upper bottom wall section.

* * * * *

UNITED STATES PATENT AND TRADEMARK OFFICE
CERTIFICATE OF CORRECTION

PATENT NO. : 8,646,742 B2  Page 1 of 1
APPLICATION NO. : 13/002115
DATED : February 11, 2014
INVENTOR(S) : Hayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 150 days.

Signed and Sealed this
Twenty-ninth Day of September, 2015

Michelle K. Lee
*Director of the United States Patent and Trademark Office*